US 8,274,536 B2

(12) United States Patent
Chaudhri et al.

(10) Patent No.: US 8,274,536 B2
(45) Date of Patent: Sep. 25, 2012

(54) SMART KEYBOARD MANAGEMENT FOR A MULTIFUNCTION DEVICE WITH A TOUCH SCREEN DISPLAY

(75) Inventors: Imran Chaudhri, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 12/566,664

(22) Filed: Sep. 25, 2009

(65) Prior Publication Data
US 2010/0231612 A1 Sep. 16, 2010

Related U.S. Application Data

(60) Provisional application No. 61/210,331, filed on Mar. 16, 2009.

(51) Int. Cl.
*G09G 5/00* (2006.01)
(52) U.S. Cl. ........ 345/684; 345/672; 345/676; 715/784; 715/787
(58) Field of Classification Search .................. 345/676; 715/784
See application file for complete search history.

(56) References Cited

U.S. PATENT DOCUMENTS

| | | | | |
|---|---|---|---|---|
| 5,864,330 | A * | 1/1999 | Haynes | 715/856 |
| 6,661,920 | B1 | 12/2003 | Skinner | 382/187 |
| 2002/0075317 | A1* | 6/2002 | Dardick | 345/808 |
| 2002/0167545 | A1 | 11/2002 | Kang et al. | 345/780 |
| 2008/0122796 | A1* | 5/2008 | Jobs et al. | 345/173 |
| 2008/0177468 | A1* | 7/2008 | Halters et al. | 701/208 |

FOREIGN PATENT DOCUMENTS

| | | |
|---|---|---|
| EP | 0464 712 A2 | 1/1992 |
| EP | 1 327 929 A1 | 7/2003 |

OTHER PUBLICATIONS

Anonymous, "Accessibility tutorials for Windows XP: How to turn on and use on-screen keyboard," Mar. 19, 2008, pp. 1-3, http://web.archive.org/web/20080319035211/http://www/microsoft.com/enable/training/windowsxp/oskturnonuse.aspx.
Anonymous, "Step by step tutorials for Windows XP: On-screen keyboard: Select a font for on-screen keyboard keys," Jun. 22, 2003, http://replay.waybackmachine.org/200306221916040/http://www.microsoft.com/enable/training/windowsxp/oskfont.aspx. Weverka, "Office 2003 All-in-One Desk Reference for Dummies—Excerpts," Oct. 2003, pp. 1-3, and 7-18, http://eu.wiley.com/WileyCDA/WileyTitle/productCd-0764538837,descCd-tableOfContents.htm.
European Search Report dated Apr. 28, 2011, received in European Application No. 11151081.4, which corresponds to U.S. Appl. No. 12/789,666.
International Search Report and Written Opinion dated Apr. 28, 2011, received in International Application No. PCT/US2011/021235, which corresponds to U.S. Appl. No. 12/789,666.

* cited by examiner

*Primary Examiner* — Michelle L Sams
(74) *Attorney, Agent, or Firm* — Morgan, Lewis & Bockius LLP

(57) ABSTRACT

A method is performed at a multifunction device with a touch screen display. The method includes displaying a text entry interface with a soft keyboard in a first area and a viewing area with a first size to display scrollable information. The method detects a finger gesture on the viewing area, and responds to the gesture. When the viewing area displays only a portion of the information, the response includes: (1) ceasing to display the soft keyboard, (2) expanding the viewing area to a second size, including at least some of the first area, and (3) scrolling the information in the expanded viewing area. When the viewing area with the first size displays all of the information, the response includes: (1) maintaining display of the soft keyboard, (2) keeping the viewing area at the first size, and (3) moving the information in the viewing area based on the finger gesture.

25 Claims, 25 Drawing Sheets

SMART KEYBOARD MANAGEMENT FOR A MULTIFUNCTION DEVICE WITH A TOUCH SCREEN DISPLAY

RELATED APPLICATIONS

This application claims priority to U.S. Provisional Patent Application No. 61/210,331, "Smart Keyboard Management for a Multifunction Device with a Touch Screen Display," filed Mar. 16, 2009, which is incorporated by reference herein in its entirety.

TECHNICAL FIELD

The disclosed embodiments relate generally to electronic devices with touch screen displays that present soft keyboards on the touch screen display. More particular, the disclosed embodiments relate to management of when a soft keyboard is displayed.

BACKGROUND

Multifunction devices with touch screen displays may utilize a soft keyboard on the display to facilitate text entry. A typical soft keyboard is an image on the display showing letters or other symbols, and may be arranged like the keys of an ordinary keyboard or typewriter. A user may use a finger to "press" the buttons on a soft keyboard, thus entering text or performing other actions.

One difficulty with a soft keyboard is that it occupies space on the display. This is particularly problematic when the touch screen is small, such as the screen on some portable handheld devices. The space occupied by the soft keyboard is not available for other objects or applications, such as information content, graphics, or interactive controls (e.g., buttons).

When a touch screen display has scrollable information, the presence of a soft keyboard can increase the time it takes to scroll to desired information. For example, each swipe to scroll the information is smaller, thus requiring more swipes to scroll the necessary amount.

Accordingly, there is a need for multifunction devices that optimize a touch screen display by displaying or hiding a soft keyboard based on user actions. Such methods and interfaces may complement or replace conventional methods for displaying or hiding a soft keyboard. Such methods and interfaces reduce the cognitive burden on a user and produce a more efficient human-machine interface. For battery-operated multifunction devices, such methods and interfaces conserve power and increase the time between battery charges.

SUMMARY

The above deficiencies and other problems associated with user interfaces for multifunction devices with touch screen displays are reduced or eliminated by the disclosed devices. In some embodiments, the device is a desktop computer. In some embodiments, the device is portable (e.g., a notebook computer or handheld device). In some embodiments, the device has a touchpad. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch screen display. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a computer-implemented method is performed at a multifunction device with a touch screen display. The computer-implemented method includes displaying a text entry interface on the touch screen display. The text entry interface includes a soft keyboard in a first area on the touch screen display, and a viewing area configured to display scrollable information. The viewing area has a first size when the soft keyboard is displayed. The computer-implemented method further includes detecting a finger gesture on the viewing area. In response to detecting the finger gesture on the viewing area, the computer-implemented method further includes ceasing to display the soft keyboard and expanding the viewing area to a second size. The expanded viewing area includes at least some of the first area. The computer-implemented method further includes scrolling information in the expanded viewing area.

In accordance with some embodiments, a multifunction device includes a touch screen display, one or more processors, memory, and one or more programs. The one or more programs are stored in the memory and configured to be executed by the one or more processors. The one or more programs include instructions for displaying a text entry interface on the touch screen display. The text entry interface includes a soft keyboard in a first area on the touch screen display, and a viewing area configured to display scrollable information. The viewing area has a first size when the soft keyboard is displayed. The one or more programs further include instructions for detecting a finger gesture on the viewing area. In response to detecting the finger gesture on the viewing area, the one or more programs further include instructions for ceasing to display the soft keyboard and for expanding the viewing area to a second size. The expanded viewing area includes at least some of the first area. The one or more programs further include instructions for scrolling information in the expanded viewing area.

In accordance with some embodiments, a computer readable storage medium has stored therein instructions which when executed by a multifunction device with a touch screen display, cause the device to display a text entry interface on the touch screen display. The text entry interface includes a soft keyboard in a first area on the touch screen display, and a viewing area configured to display scrollable information. The viewing area has a first size when the soft keyboard is displayed. The computer readable storage medium further has stored instructions which when executed by a multifunction device cause the device to detect a finger gesture on the viewing area. In response to detecting the finger gesture on the viewing area, the computer readable storage medium further has stored instructions which when executed by a multifunction device cause the device to cease to display the soft keyboard and to expand the viewing area to a second size. The expanded viewing area includes at least some of the first area. The computer readable storage medium further has stored instructions which when executed by a multifunction device cause the device to scroll information in the expanded viewing area.

In accordance with some embodiments, a multifunction device includes a touch screen display and a means for displaying a text entry interface on the touch screen display. The text entry interface includes a soft keyboard in a first area on the touch screen display, and a viewing area configured to display scrollable information. The viewing area has a first size when the soft keyboard is displayed. The multifunction device further includes a means for detecting a finger gesture on the viewing area. In response to detecting the finger gesture on the viewing area, the multifunction device further includes a means for ceasing to display the soft keyboard and a means for expanding the viewing area to a second size. The expanded viewing area includes at least some of the first area. The multifunction device further includes a means for scrolling information in the expanded viewing area.

In accordance with some embodiments, a graphical user interface on a multifunction device with a touch screen display includes displaying a text entry interface on the touch screen display. The text entry interface includes a soft keyboard in a first area on the touch screen display, and a viewing area configured to display scrollable information. The viewing area has a first size when the soft keyboard is displayed. The graphical user interface further includes detecting a finger gesture on the viewing area. In response to detecting the finger gesture on the viewing area, the graphical user interface further includes ceasing to display the soft keyboard and expanding the viewing area to a second size. The expanded viewing area includes at least some of the first area. The graphical user interface further includes scrolling information in the expanded viewing area.

In accordance with some embodiments, a computer-implemented method is performed at a multifunction device with a touch screen display. The computer-implemented method includes displaying a text entry interface on the touch screen display. The text entry interface includes a soft keyboard in a first area on the touch screen display, and a viewing area configured to display scrollable information. The viewing area has a first size when the soft keyboard is displayed. The computer-implemented method further includes detecting a finger gesture on the viewing area. When the viewing area with the first size displays only a portion of the scrollable information, in response to detecting the finger gesture on the viewing area the computer-implemented method includes: (1) ceasing to display the soft keyboard, (2) expanding the viewing area to a second size, where the expanded viewing area includes at least some of the first area, and (3) scrolling the scrollable information in the expanded viewing area. When the viewing area with the first size displays all of the scrollable information, in response to detecting the finger gesture on the viewing area the computer-implemented method includes: (1) maintaining display of the soft keyboard, (2) keeping the viewing area at the first size, and (3) translating the scrollable information in the viewing area in accordance with the finger gesture on the viewing area.

In accordance with some embodiments, a multifunction device includes a touch screen display, one or more processors, memory, and one or more programs. The one or more programs are stored in the memory and configured to be executed by the one or more processors. The one or more programs include instructions for displaying a text entry interface on the touch screen display. The text entry interface includes a soft keyboard in a first area on the touch screen display, and a viewing area configured to display scrollable information. The viewing area has a first size when the soft keyboard is displayed. The one or more programs further include instructions for detecting a finger gesture on the viewing area. When the viewing area with the first size displays only a portion of the scrollable information, in response to detecting the finger gesture on the viewing area the one or more programs include instructions for: (1) ceasing to display the soft keyboard, (2) expanding the viewing area to a second size, where the expanded viewing area includes at least some of the first area, and (3) scrolling the scrollable information in the expanded viewing area. When the viewing area with the first size displays all of the scrollable information, in response to detecting the finger gesture on the viewing area the one or more programs include instructions for: (1) maintaining display of the soft keyboard, (2) keeping the viewing area at the first size, and (3) translating the scrollable information in the viewing area in accordance with the finger gesture on the viewing area.

In accordance with some embodiments, a computer readable storage medium has stored therein instructions which when executed by a multifunction device with a touch screen display, cause the device to display a text entry interface on the touch screen display. The text entry interface includes a soft keyboard in a first area on the touch screen display, and a viewing area configured to display scrollable information. The viewing area has a first size when the soft keyboard is displayed. The computer readable storage medium further has stored instructions which when executed by a multifunction device cause the device to detect a finger gesture on the viewing area. When the viewing area with the first size displays only a portion of the scrollable information, in response to detecting the finger gesture on the viewing area the computer readable storage medium further has stored instructions which when executed by a multifunction device cause the device to: (1) cease to display the soft keyboard, (2) expand the viewing area to a second size, where the expanded viewing area includes at least some of the first area, and (3) scroll the scrollable information in the expanded viewing area. When the viewing area with the first size displays all of the scrollable information, in response to detecting the finger gesture on the viewing area the computer readable storage medium further has stored instructions which when executed by a multifunction device cause the device to: (1) maintain display of the soft keyboard, (2) keep the viewing area at the first size, and (3) translate the scrollable information in the viewing area in accordance with the finger gesture on the viewing area.

In accordance with some embodiments, a multifunction device includes a touch screen display and a means for displaying a text entry interface on the touch screen display. The text entry interface includes a soft keyboard in a first area on the touch screen display, and a viewing area configured to display scrollable information. The viewing area has a first size when the soft keyboard is displayed. The multifunction device further includes a means for detecting a finger gesture on the viewing area. When the viewing area with the first size displays only a portion of the scrollable information, in response to detecting the finger gesture on the viewing area the multifunction device further includes: (1) a means for ceasing to display the soft keyboard, (2) a means for expanding the viewing area to a second size, where the expanded viewing area includes at least some of the first area, and (3) a means for scrolling the scrollable information in the expanded viewing area. When the viewing area with the first size displays all of the scrollable information, in response to detecting the finger gesture on the viewing area the multifunction device further includes: (1) a means for maintaining display of the soft keyboard, (2) a means for keeping the viewing area at the first size, and (3) a means for translating the scrollable information in the viewing area in accordance with the finger gesture on the viewing area.

In accordance with some embodiments, a graphical user interface on a multifunction device with a touch screen display includes displaying a text entry interface on the touch screen display. The text entry interface includes a soft keyboard in a first area on the touch screen display, and a viewing area configured to display scrollable information. The viewing area has a first size when the soft keyboard is displayed. The graphical user interface further includes detecting a finger gesture on the viewing area. When the viewing area with the first size displays only a portion of the scrollable information, in response to detecting the finger gesture on the viewing area the graphical user interface further includes: (1) ceasing to display the soft keyboard, (2) expanding the viewing area to a second size, where the expanded viewing area includes at least some of the first area, and (3) scrolling the scrollable information in the expanded viewing area. When the viewing area with the first size displays all of the scrollable information, in response to detecting the finger gesture on the viewing area the graphical user interface further includes: (1) maintaining display of the soft keyboard, (2) keeping the viewing area at the first size, and (3) translating the scrollable information in the viewing area in accordance with the finger gesture on the viewing area.

Thus, multifunction devices with touch screen displays are provided with faster, more efficient methods and interfaces for managing the display of soft keyboards, thereby increasing the effectiveness, efficiency, and user satisfaction with such devices. Such methods and interfaces may complement or replace conventional methods for managing soft keyboards.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
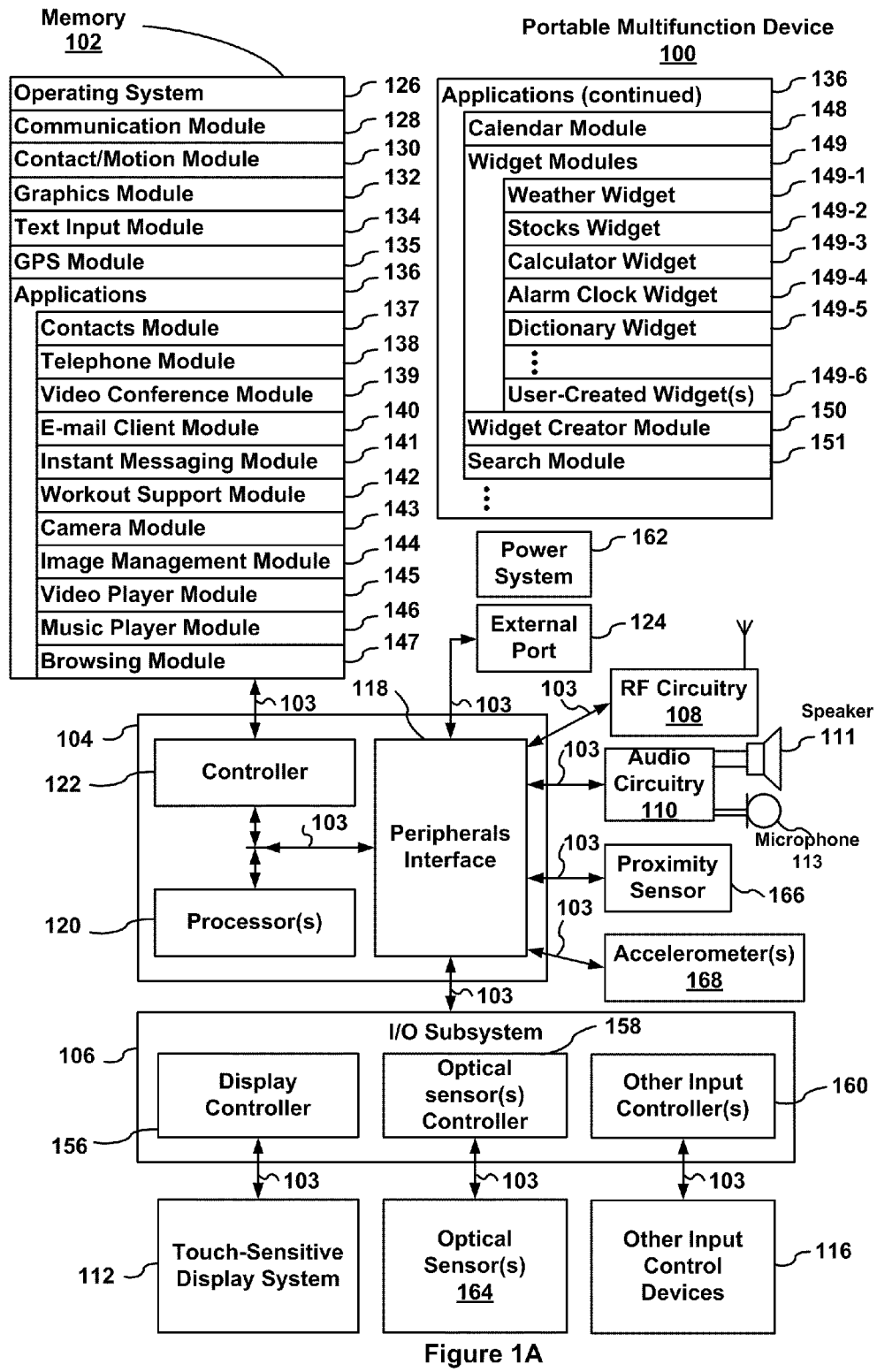
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif.

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
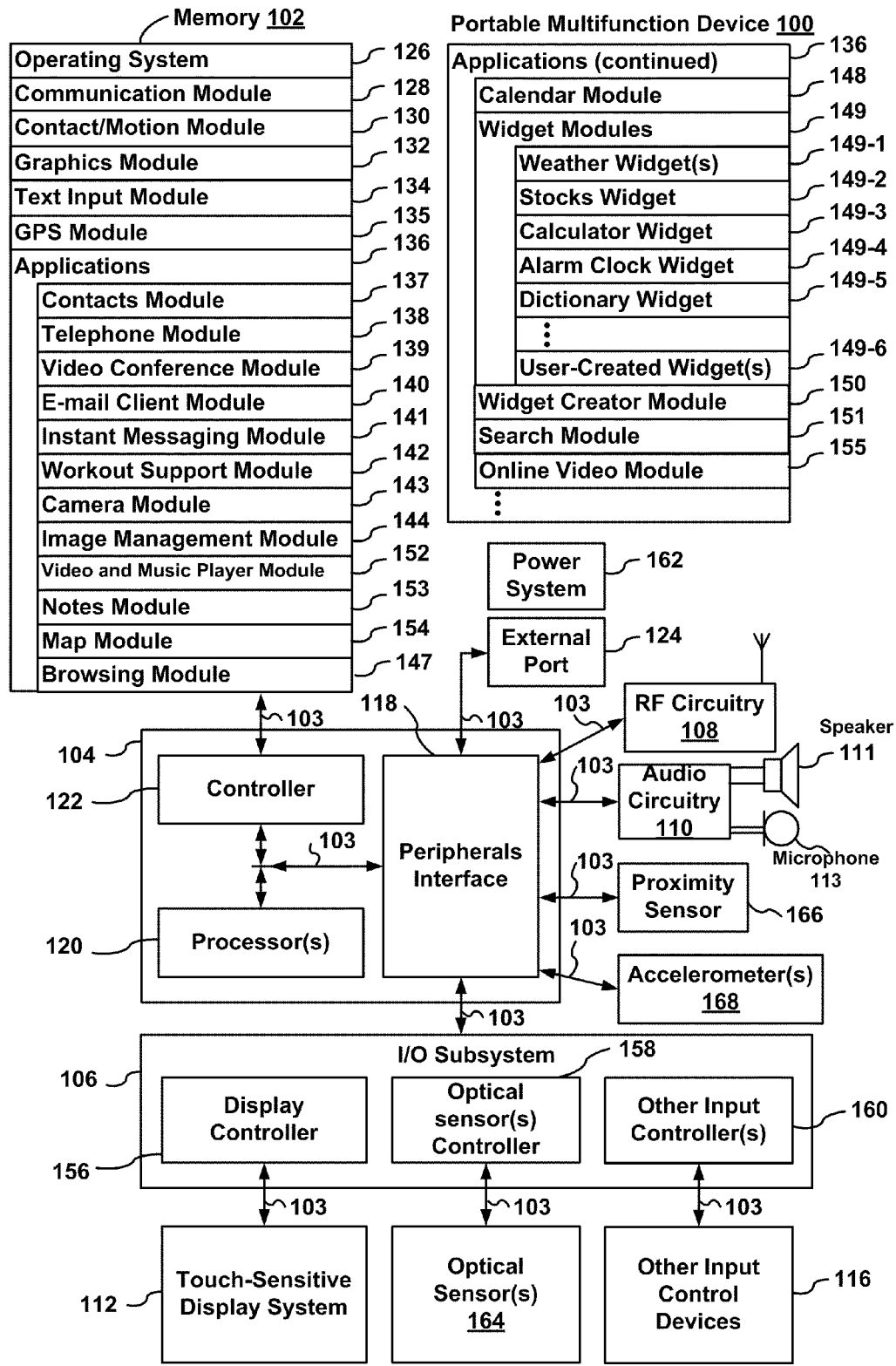

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a workout support module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
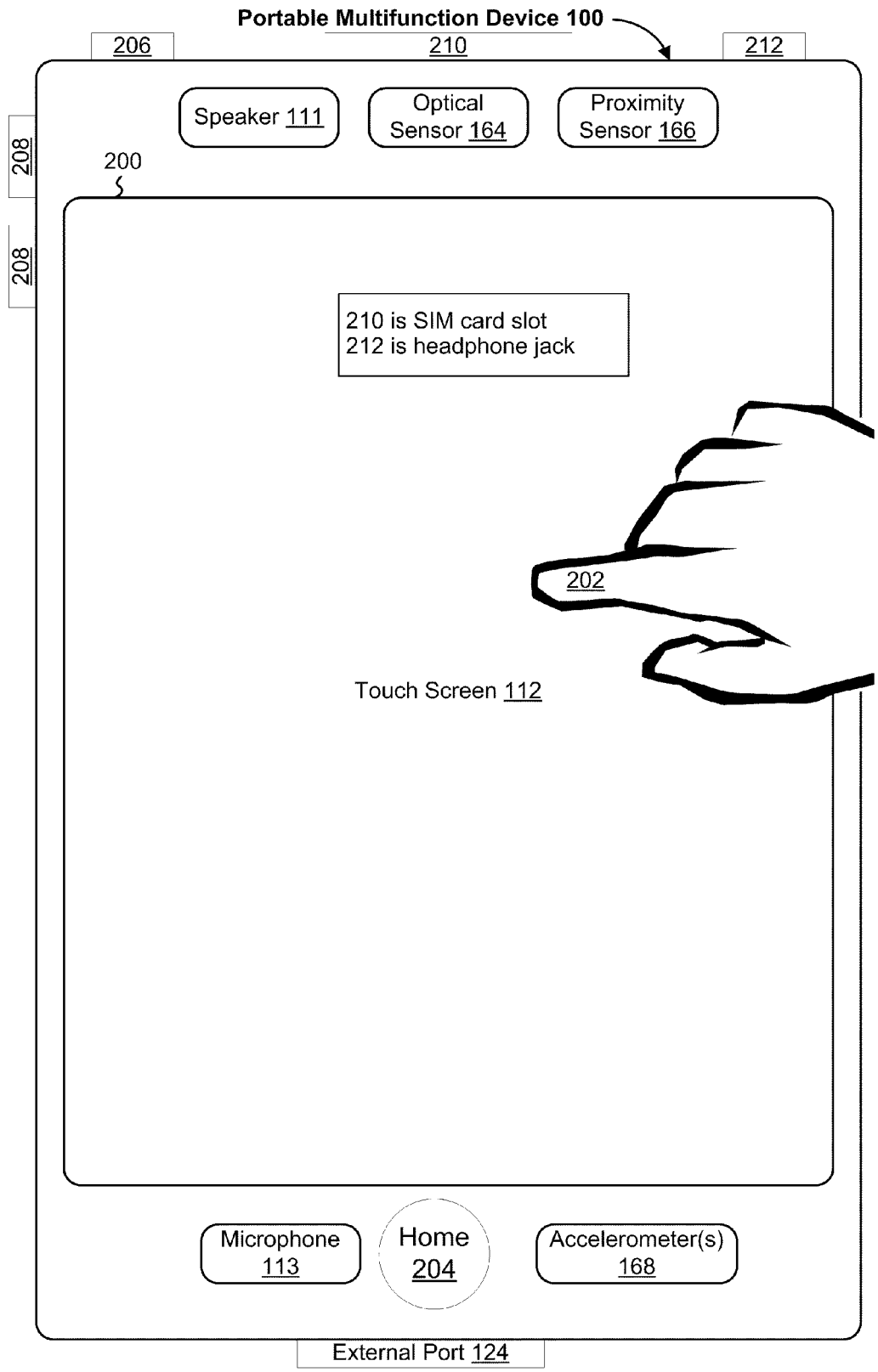
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
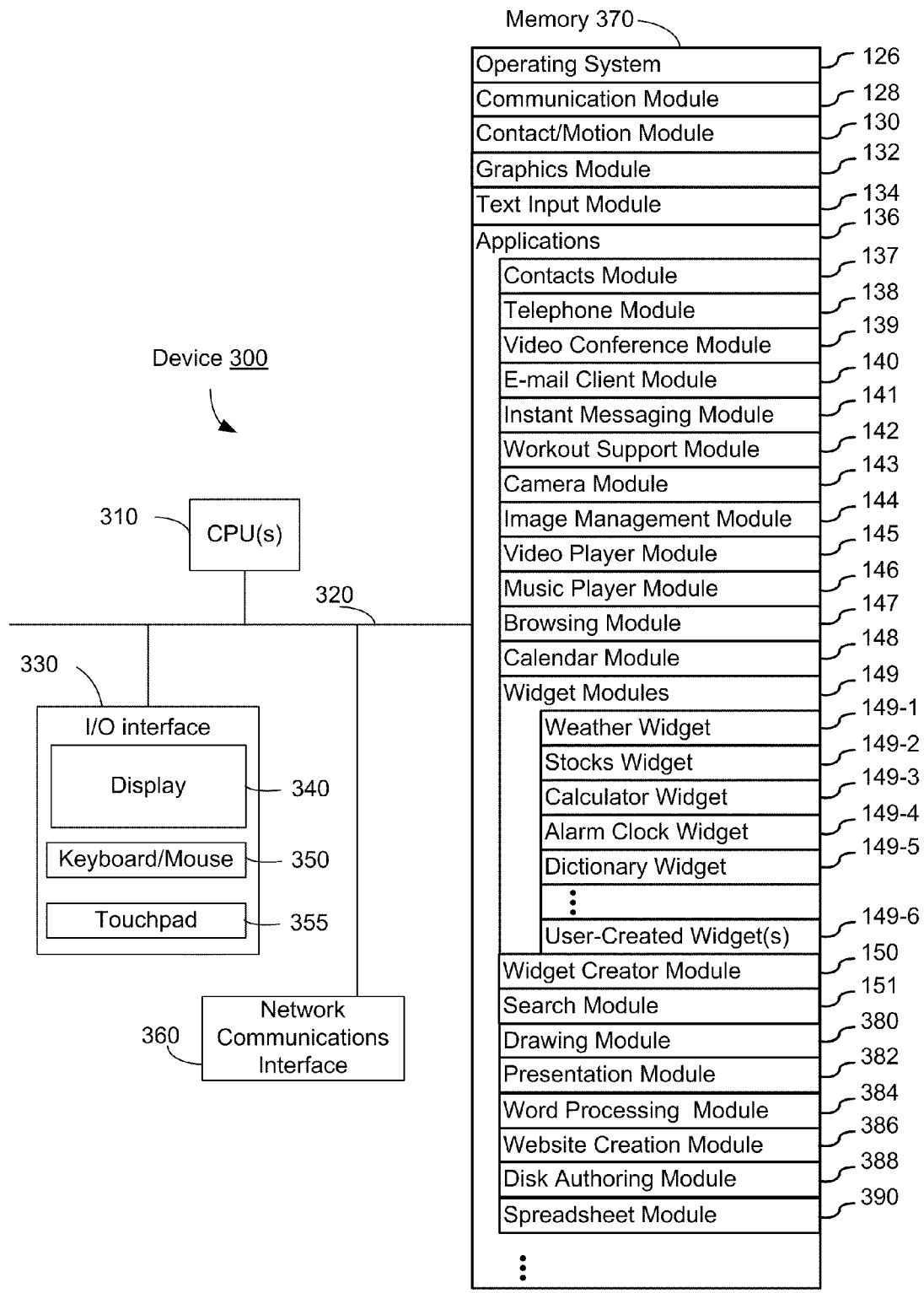
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
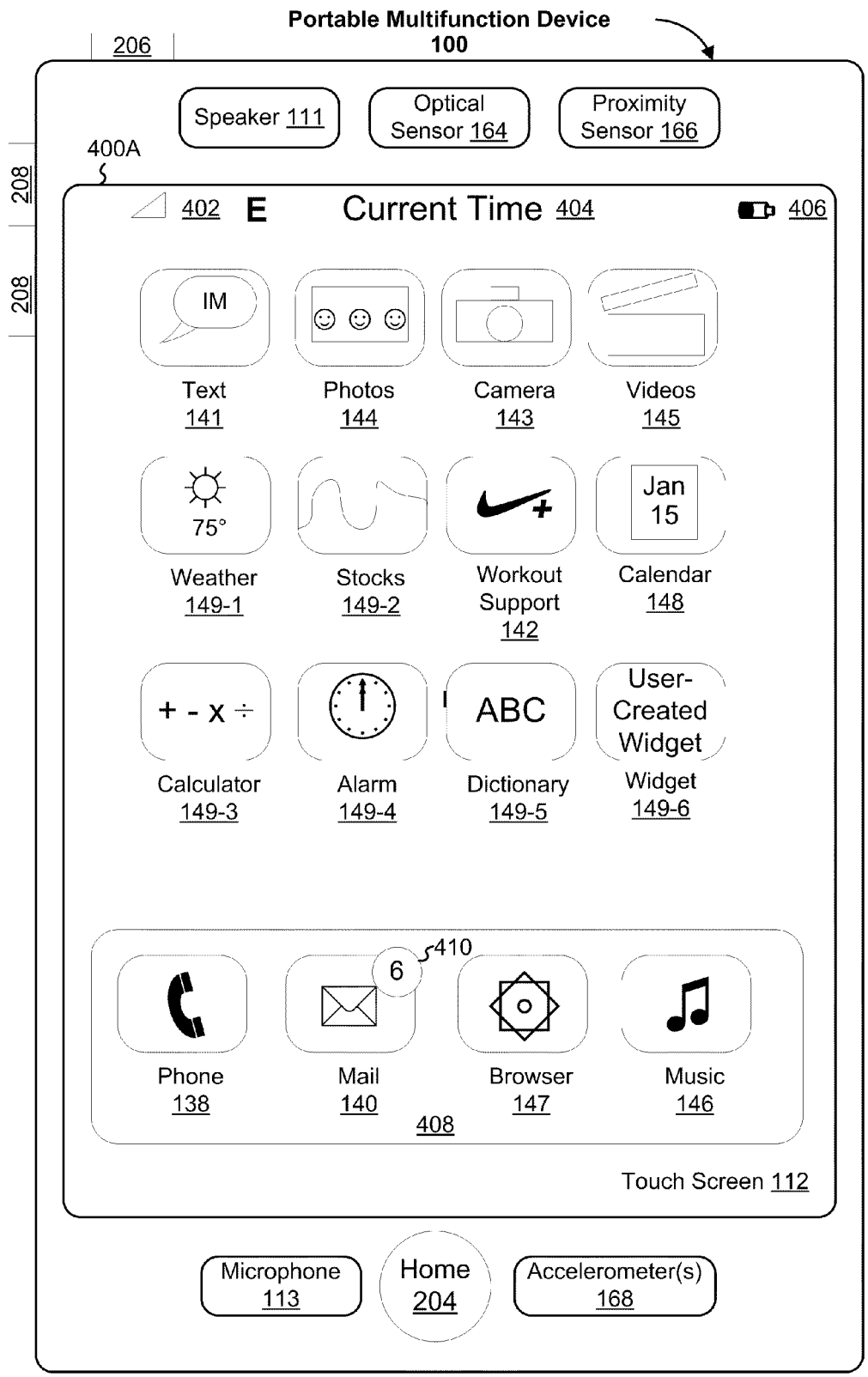
FIGS. 4A and 4B illustrate exemplary user interfaces for a menu of applications on a portable multifunction device in accordance with some embodiments.
Figure 4B:
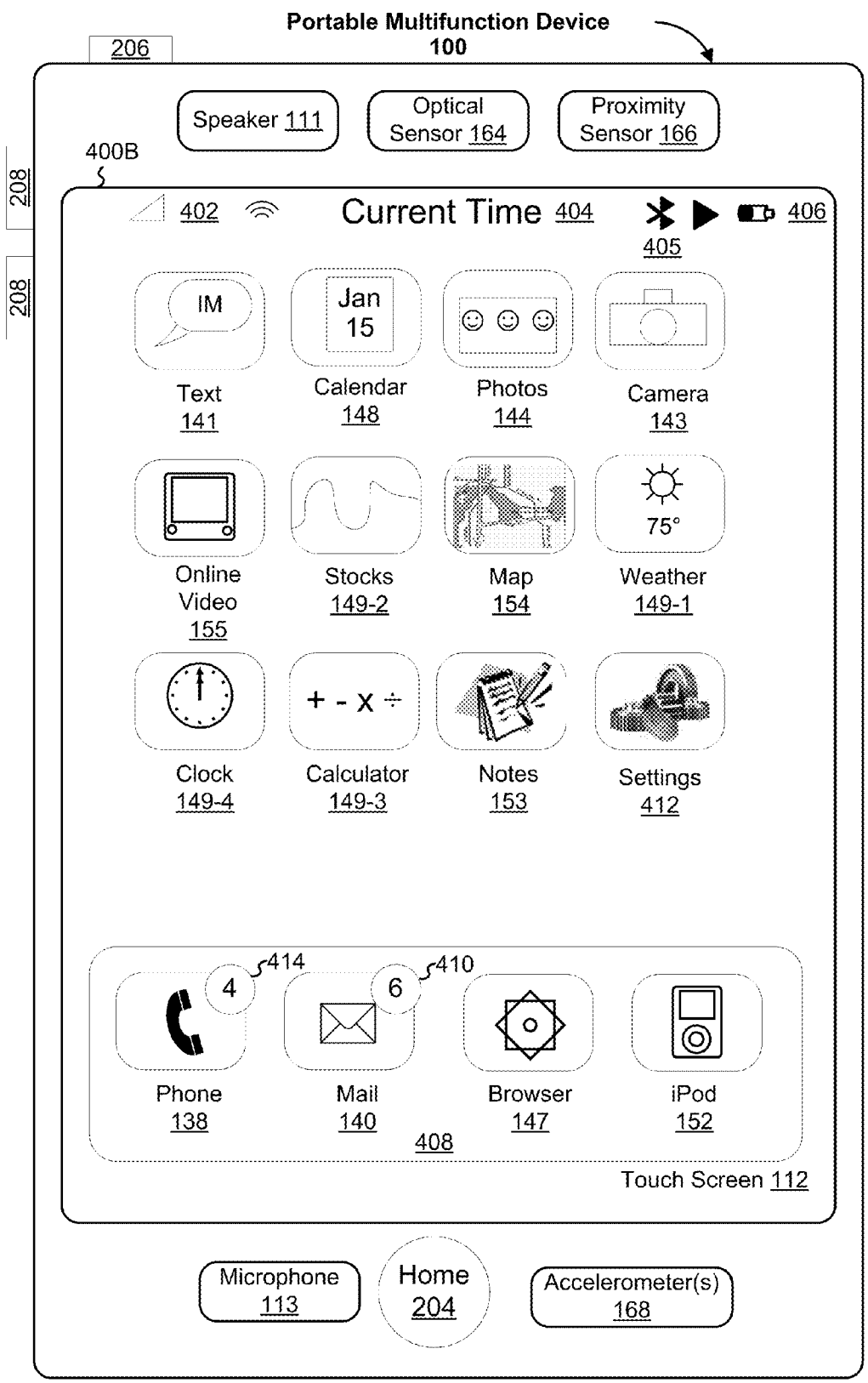

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple, Inc.) module 152; and
Online video module 155, also referred to as YouTube (trademark of Google, Inc.) module 155.

Attention is now directed towards embodiments of user interfaces ("UI") and associated processes that may be implemented on a multifunction device with a touch screen display, such as device 300 or portable multifunction device 100.

Figure 5A:
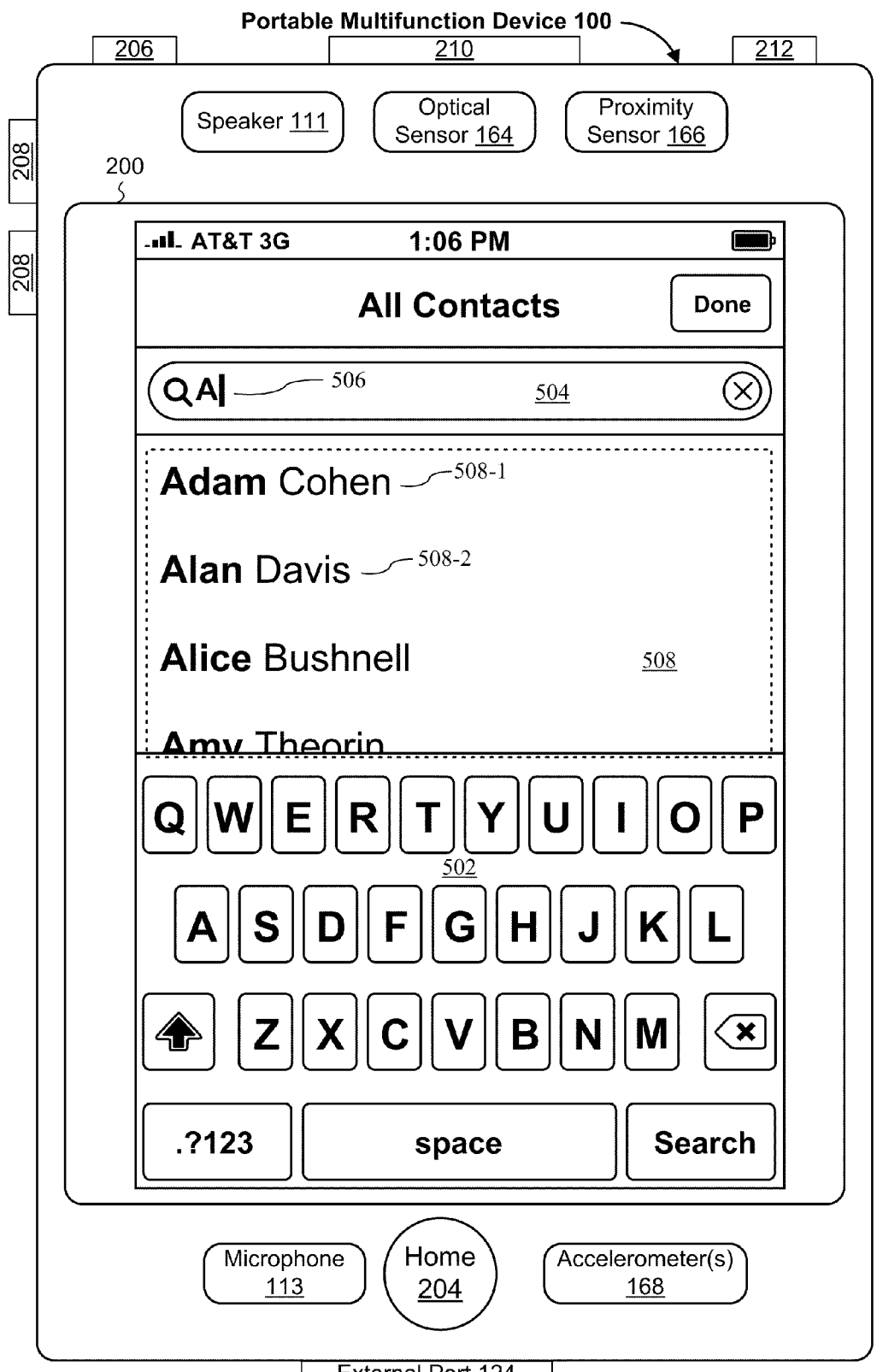
FIGS. 5A-5D illustrate scrolling search results, demonstrating smart keyboard management on a touch screen display in accordance with some embodiments.
Figure 5B:
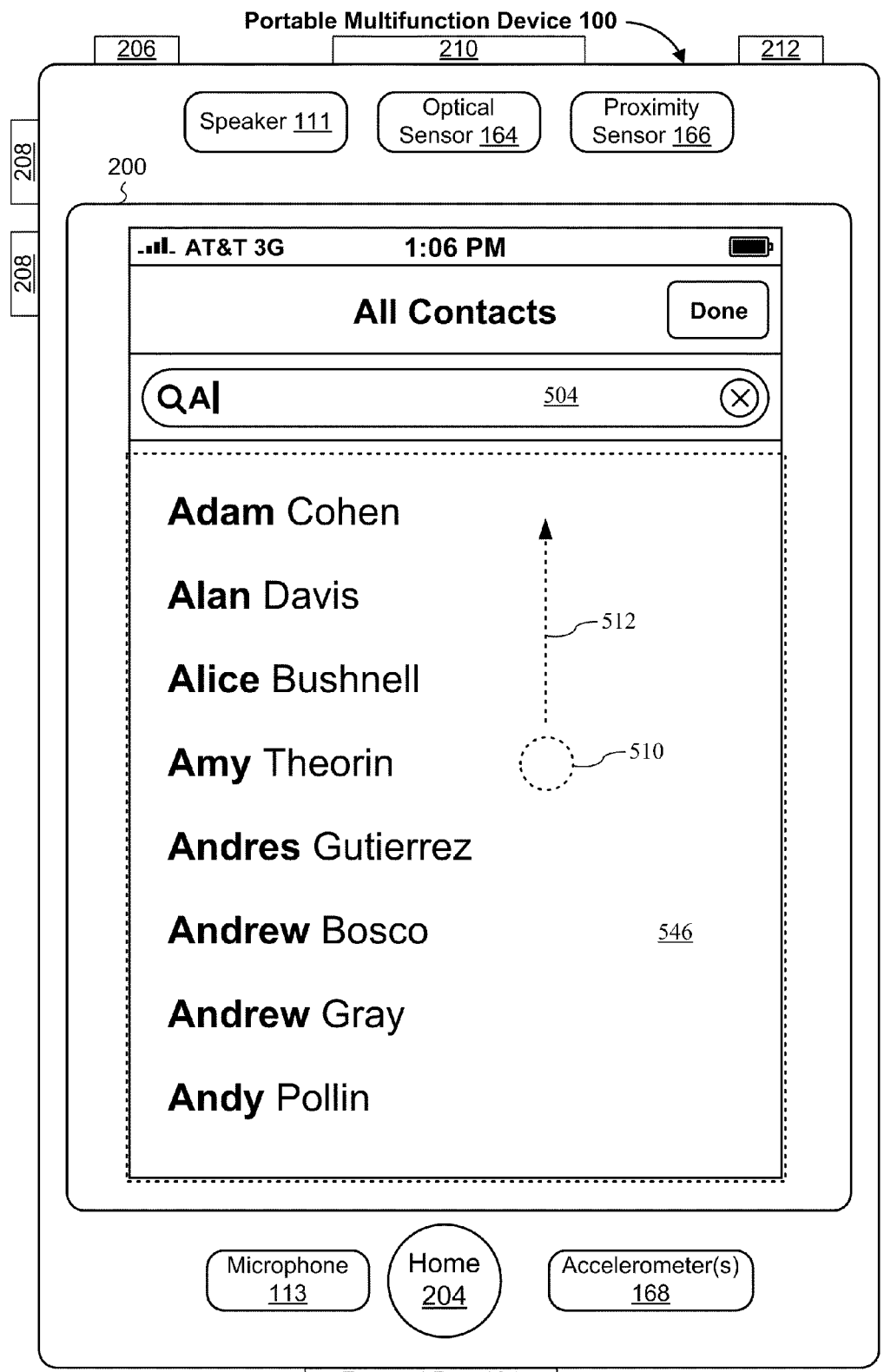
Figure 5C:
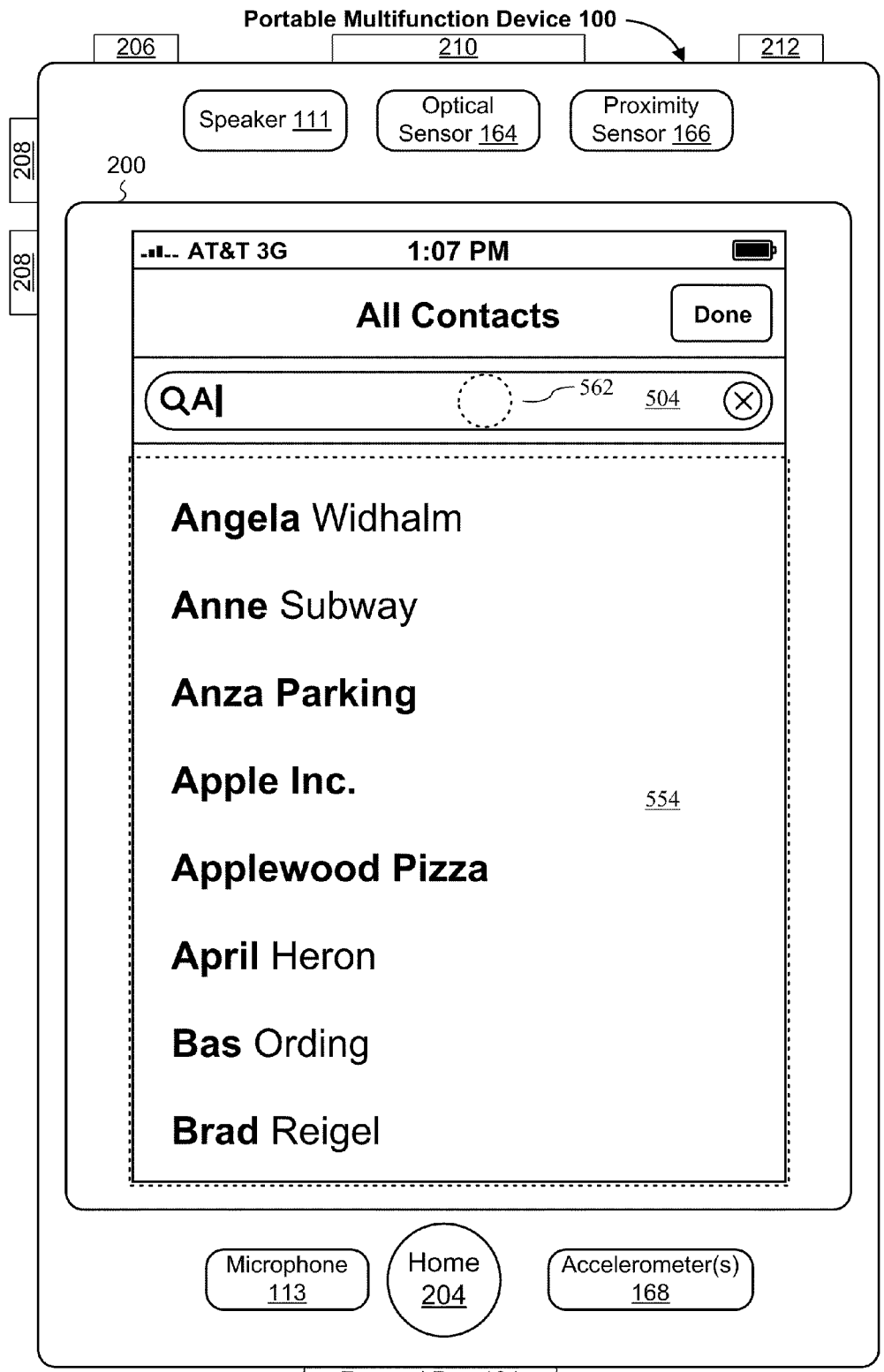
Figure 5D:
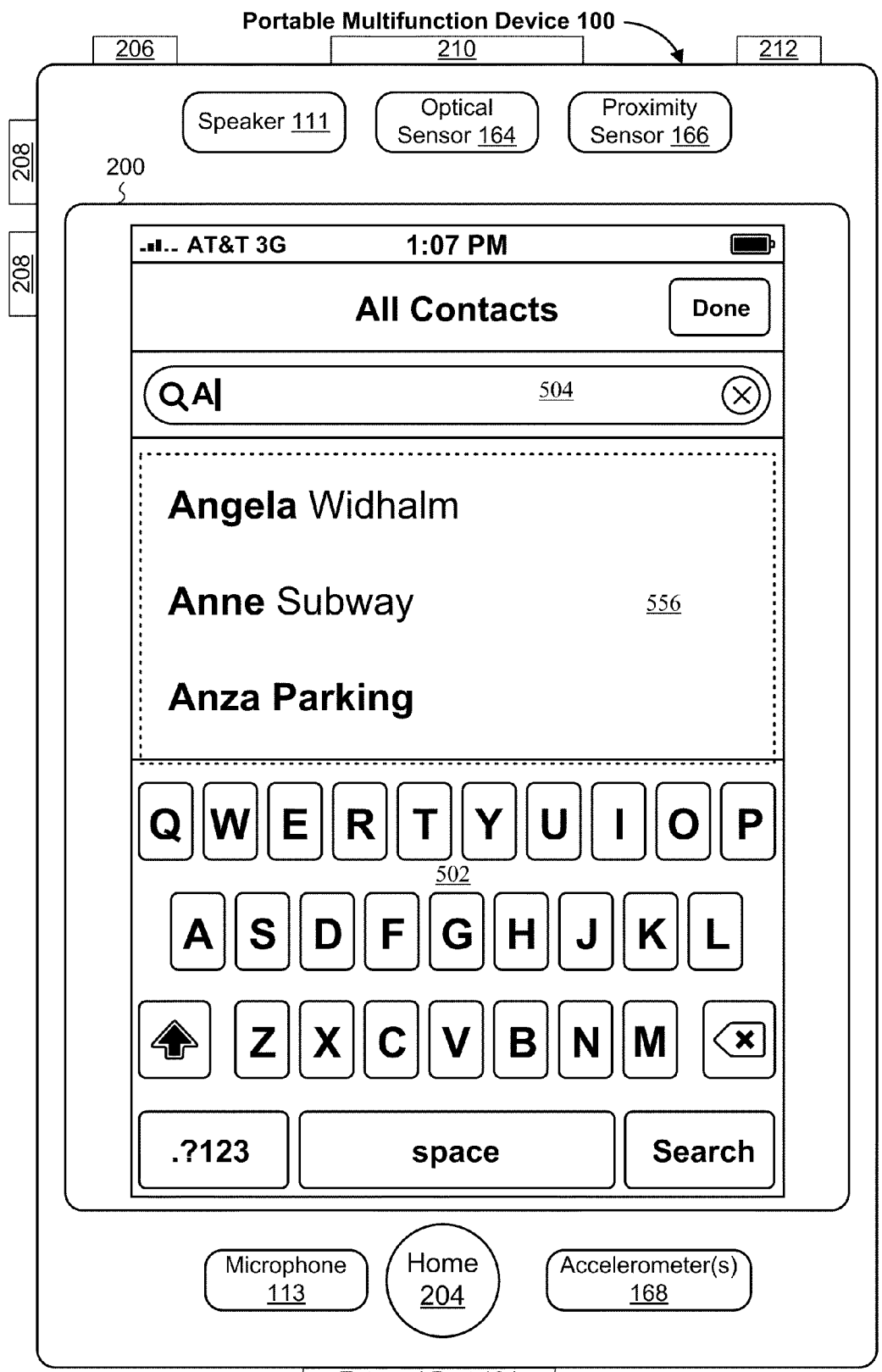

FIGS. 5A-5D illustrate an exemplary series of views of a multifunction device employing smart keyboard management in accordance with some embodiments. Text entry area 504 appears at the top of the display in this embodiment, and soft keyboard 502 appears at the bottom. In this embodiment the viewing area 508 is in the middle and contains items of information, in this example including 508-1 and 508-2. FIGS. 5B-5D illustrate hiding the soft keyboard and redisplaying the soft keyboard in accordance with some embodiments. FIGS. 5A-5D will be described more fully below with respect to FIGS. 6A-6B and 7A-7C.

Figure 5E:
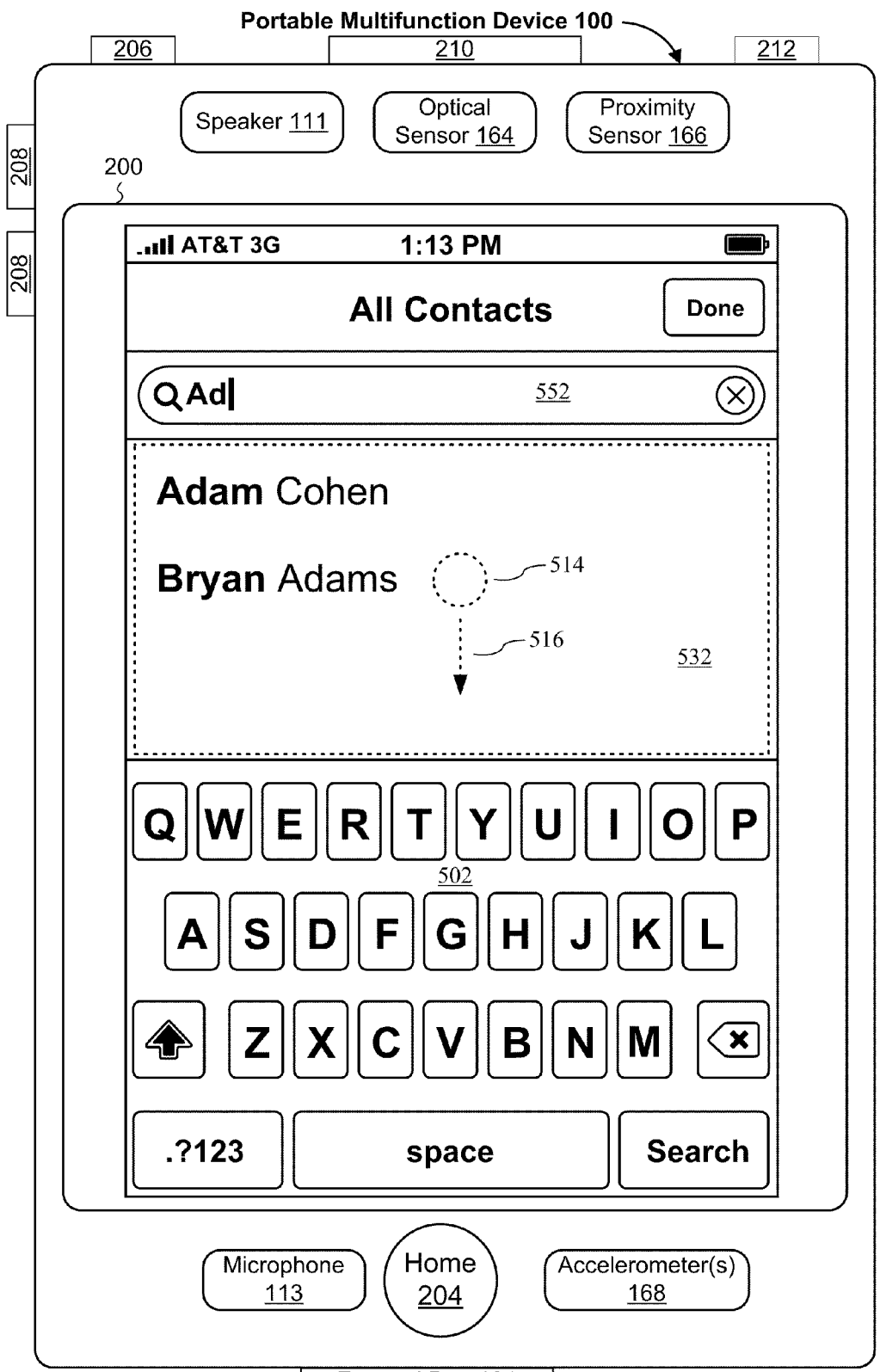
FIGS. 5E-5G illustrate scrolling search results, demonstrating smart keyboard management on a touch screen display in accordance with some embodiments.
Figure 5F:
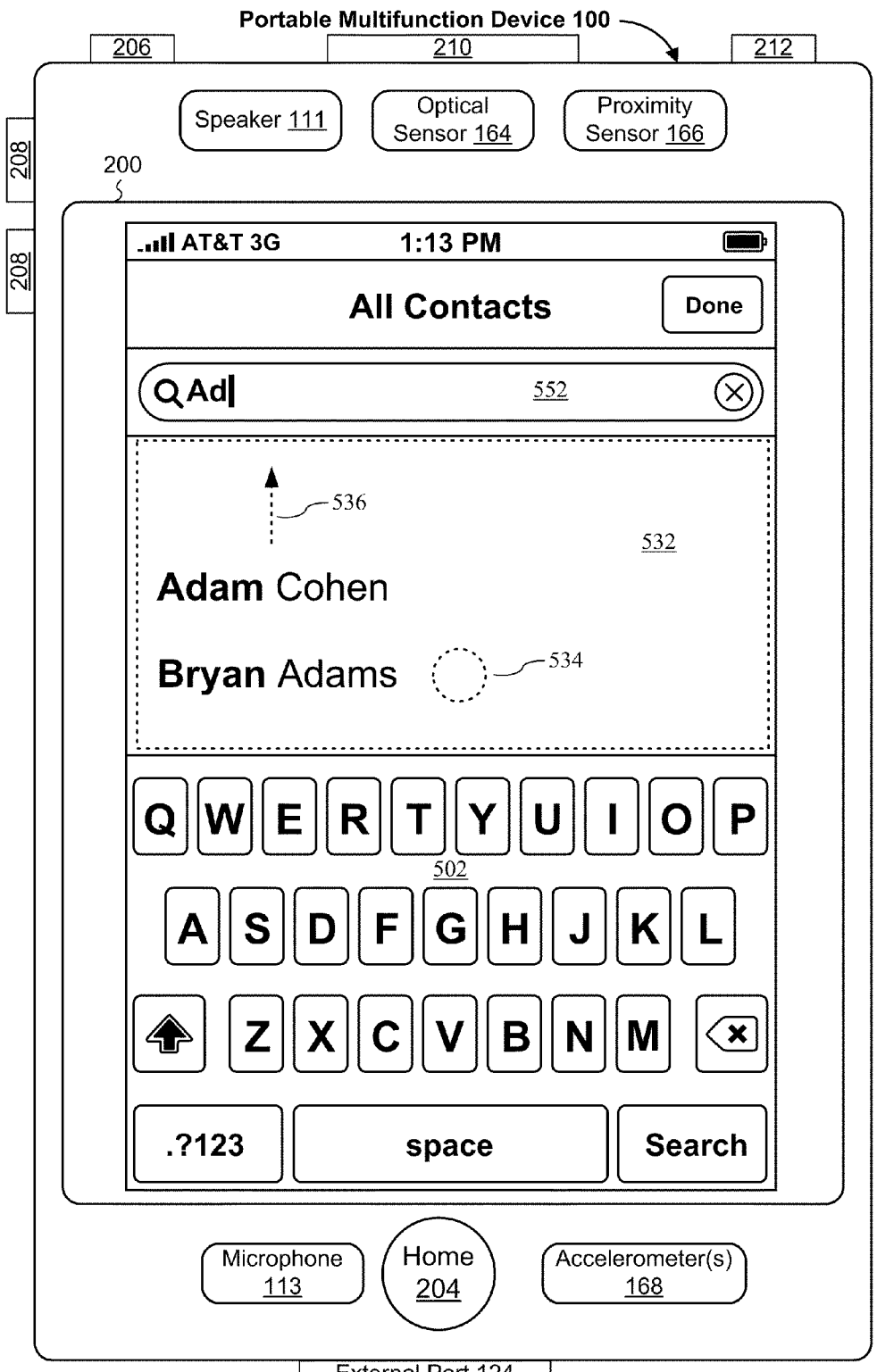
Figure 5G:
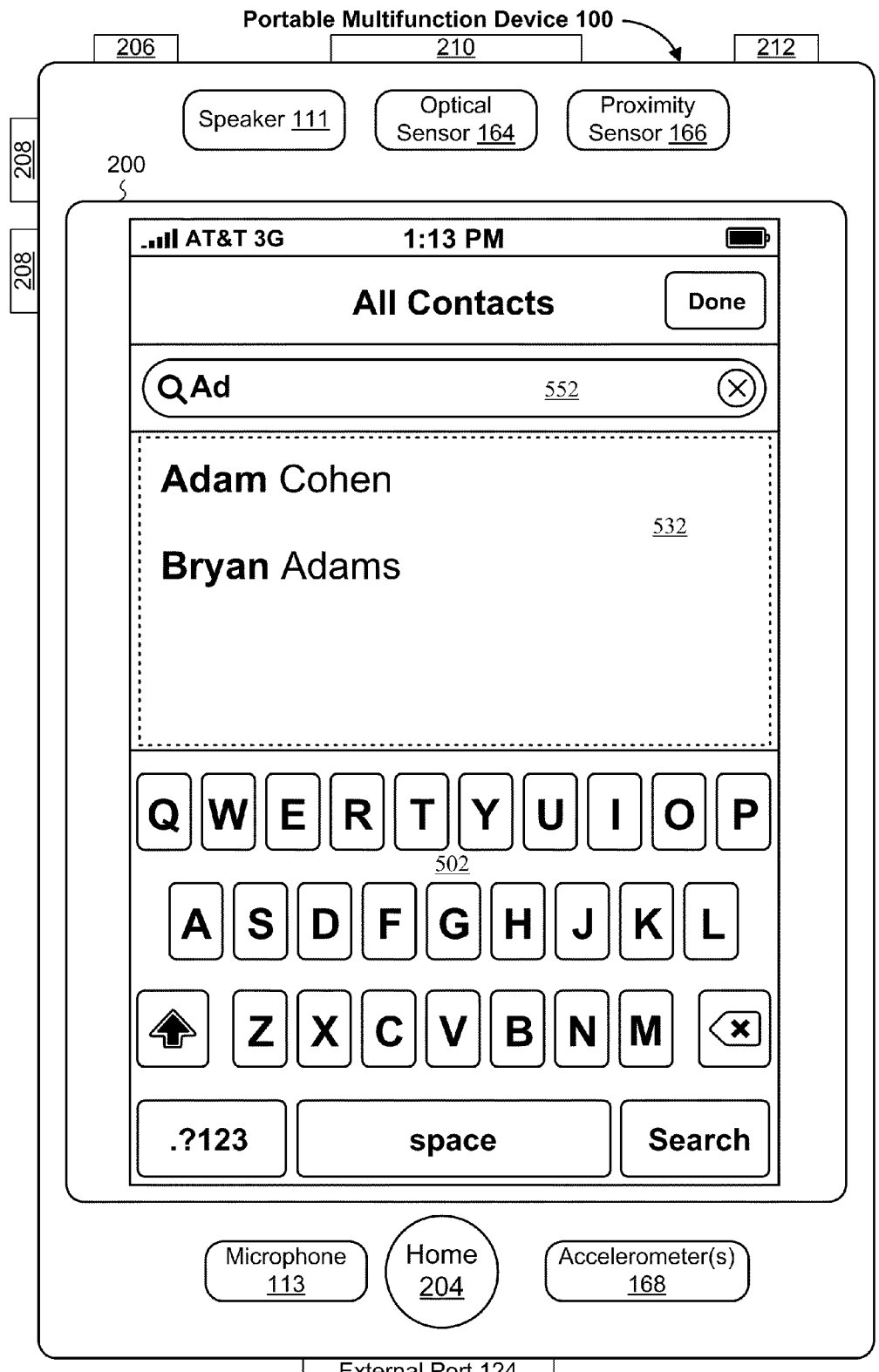

FIGS. 5E-5G illustrate an exemplary series of views of a multifunction device employing smart keyboard management in accordance with some embodiments. In this series the list of information items is small enough to display in the viewing area 532, so the soft keyboard 502 remains displayed at all times. FIGS. 5E-5G will be described in more detail below with respect to FIGS. 6A-6B and 7A-7C.

FIGS. 5H-5K illustrate an exemplary series of views of a multifunction device employing smart keyboard management in accordance with some embodiments. This series is similar to FIGS. 5A-5D, but displays a grocery list rather than contacts. FIGS. 5H-5K will be described in more detail below with respect to FIGS. 6A-6B and 7A-7C.

Figure 5H:
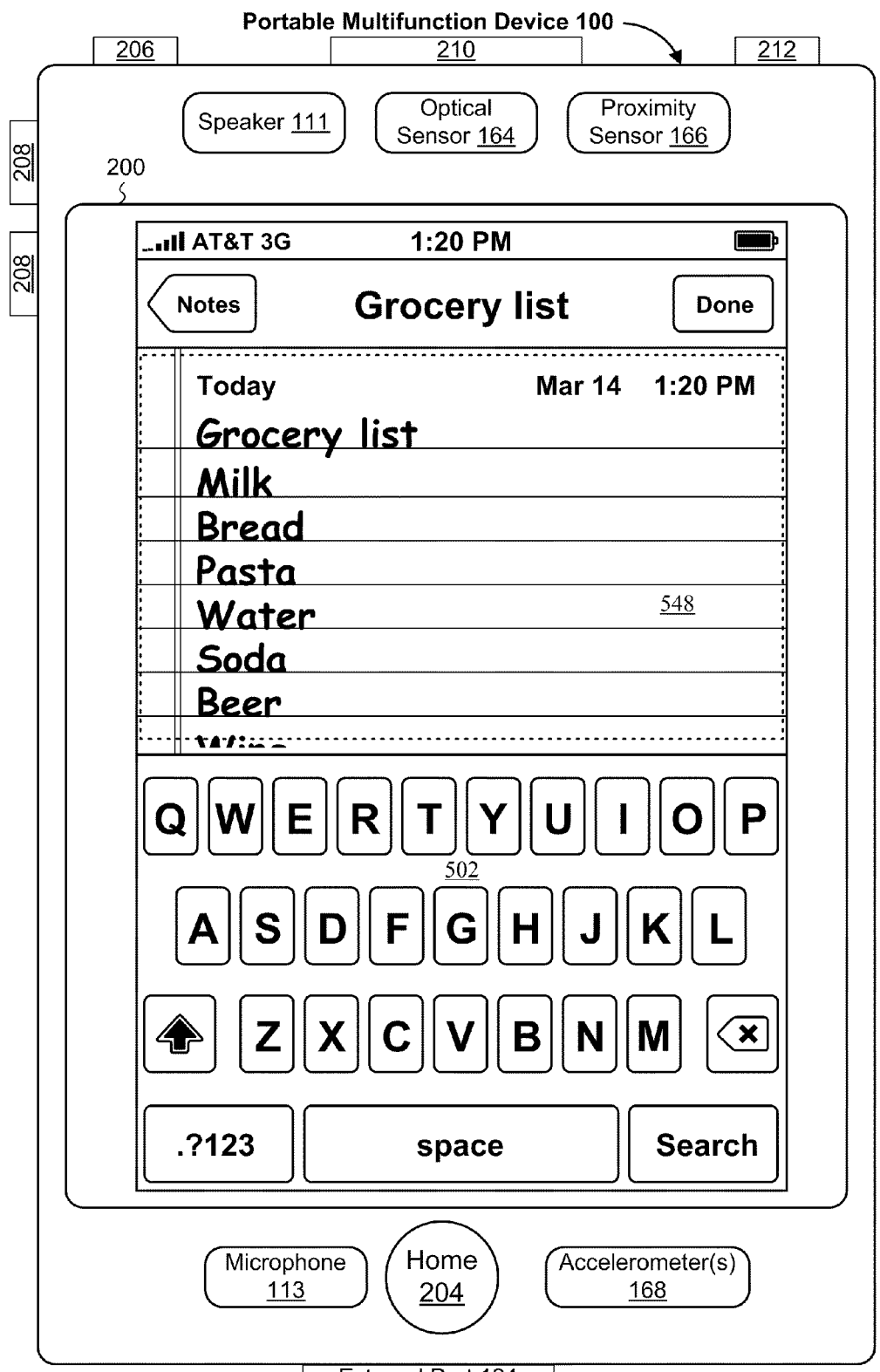
FIGS. 5H-5K illustrate scrolling through a note, demonstrating smart keyboard management on a touch screen display in accordance with some embodiments.
Figure 5I:
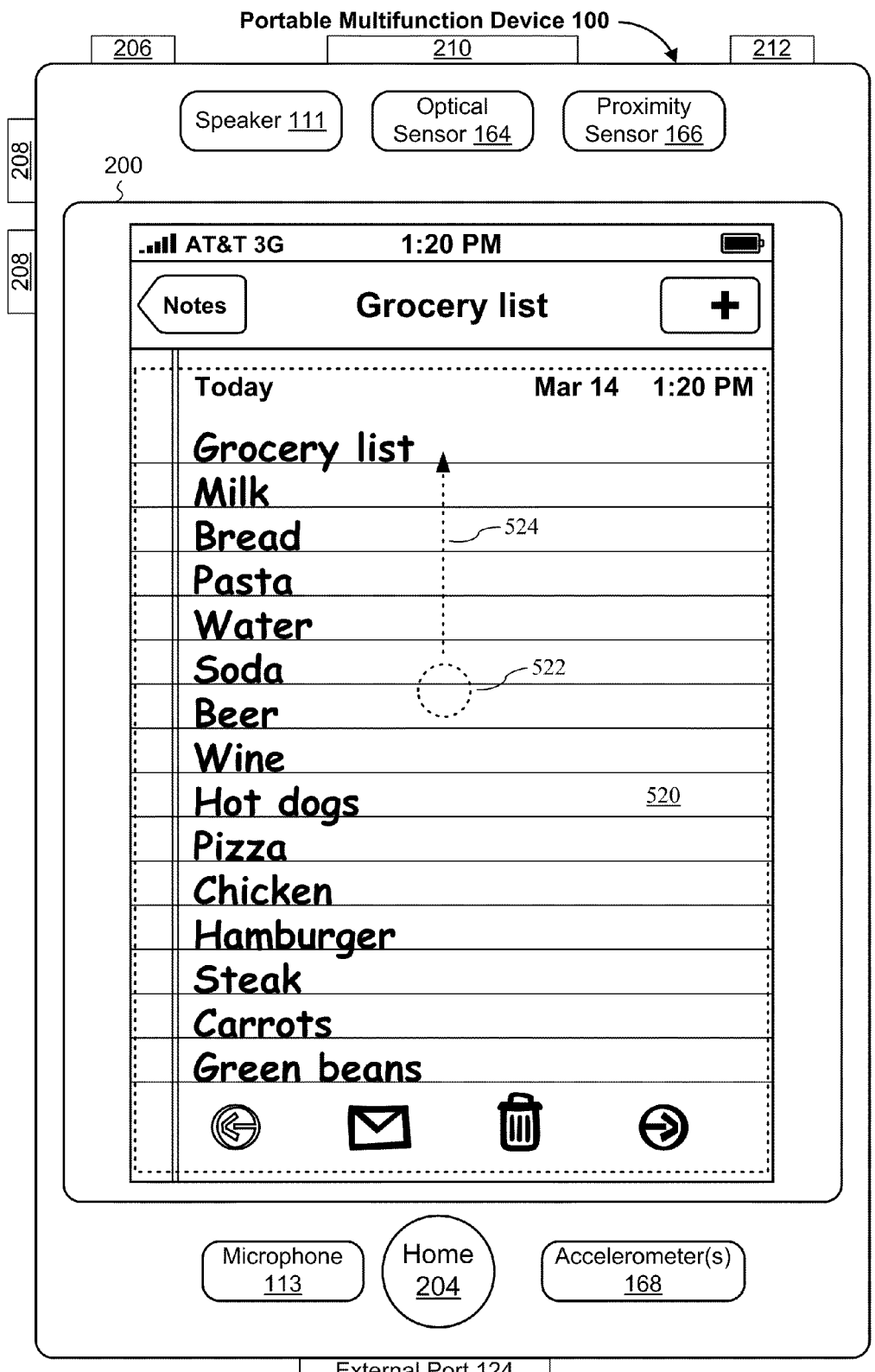
Figure 5J:
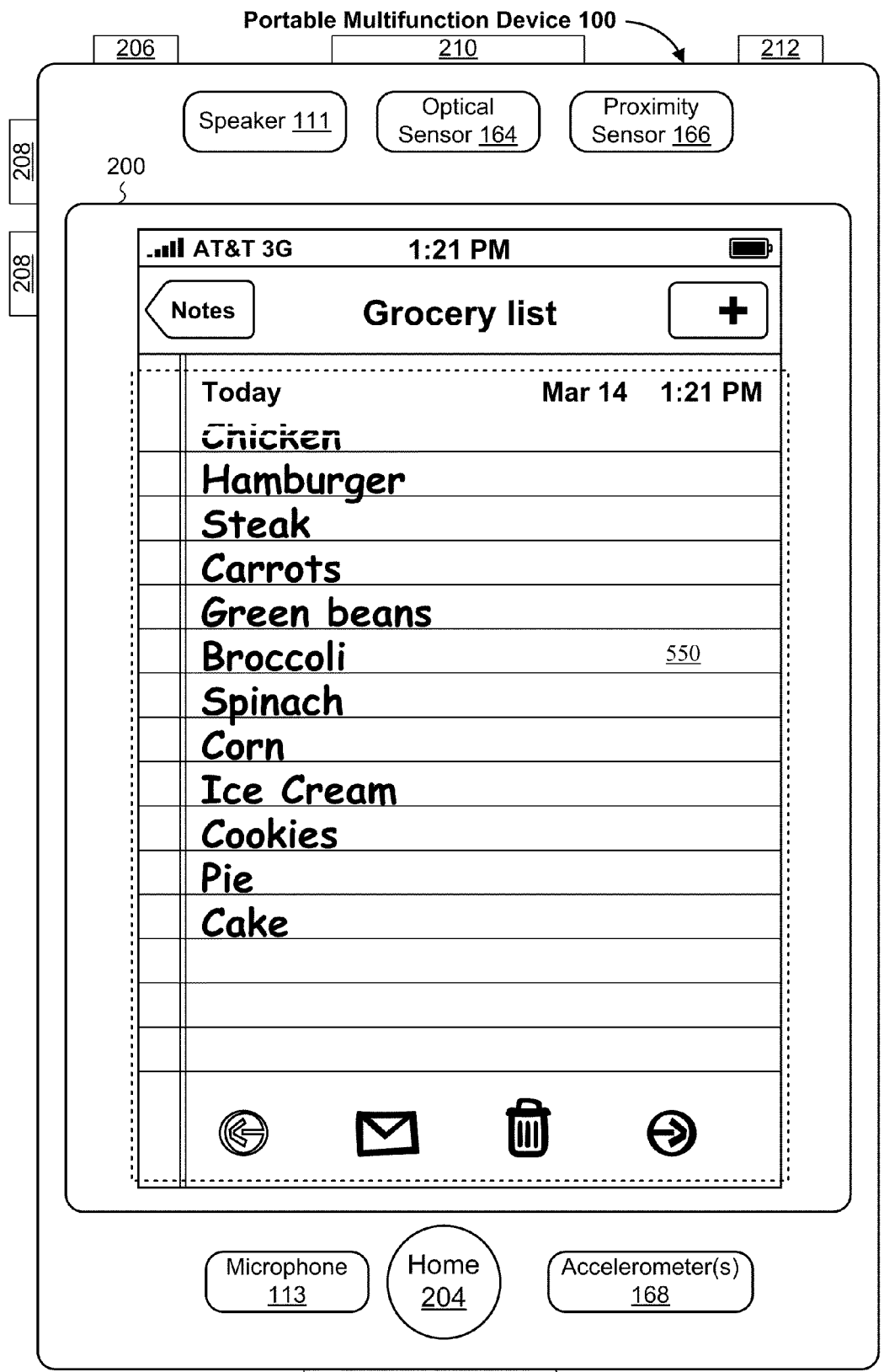
Figure 5K:
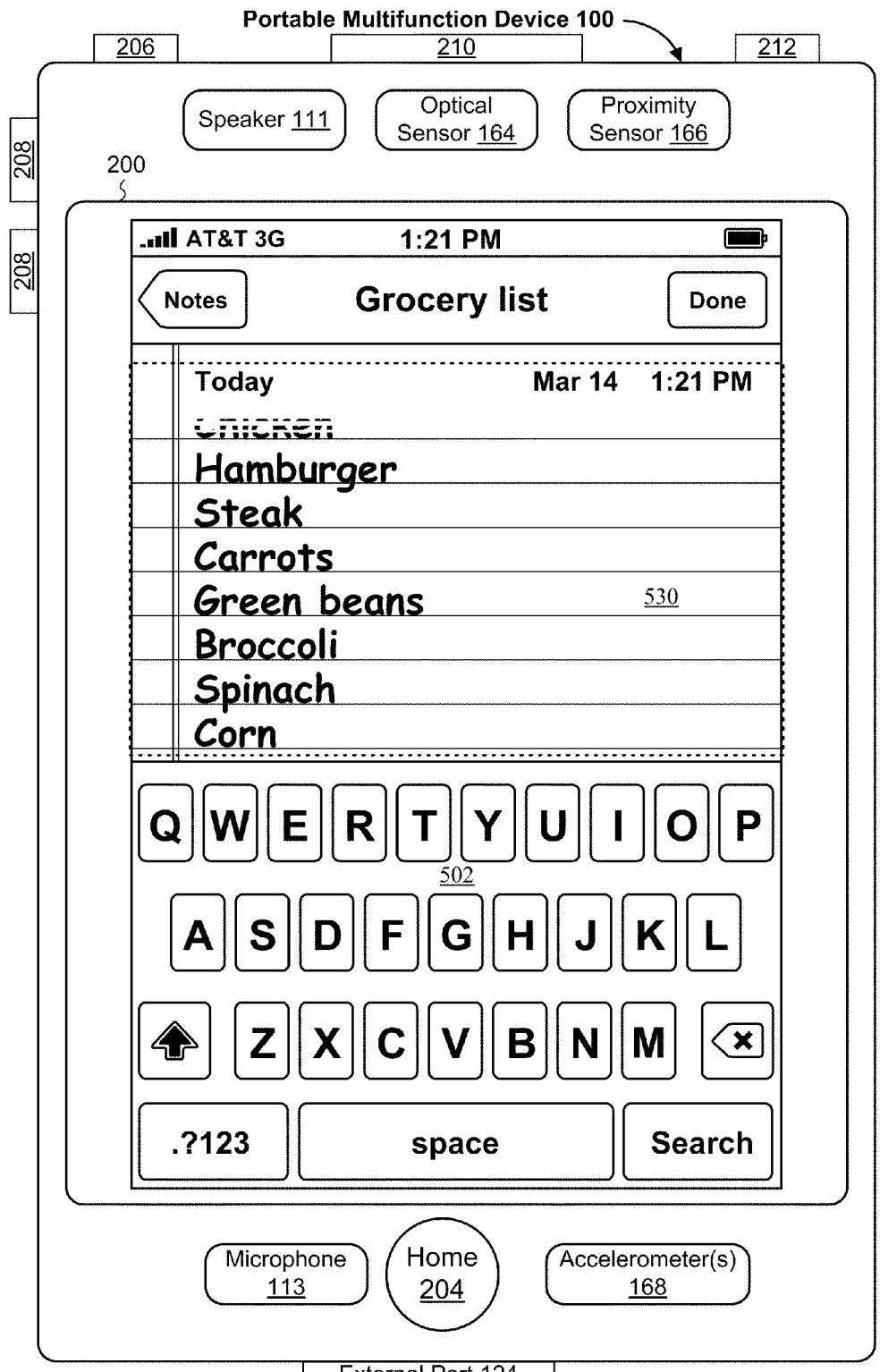
Figure 5L:
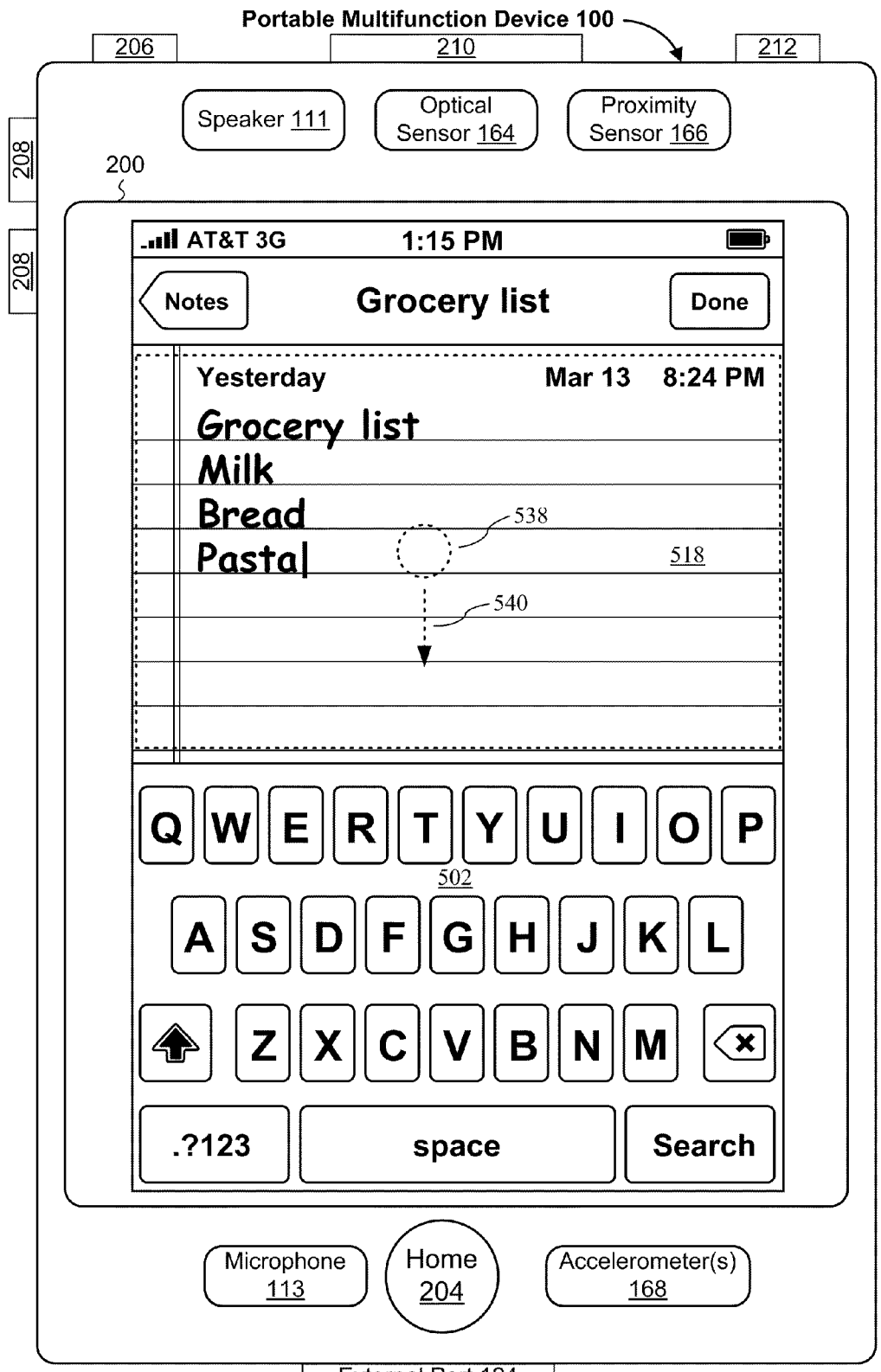
FIGS. 5L-5N illustrate scrolling through a note, demonstrating smart keyboard management on a touch screen display in accordance with some embodiments.
Figure 5M:
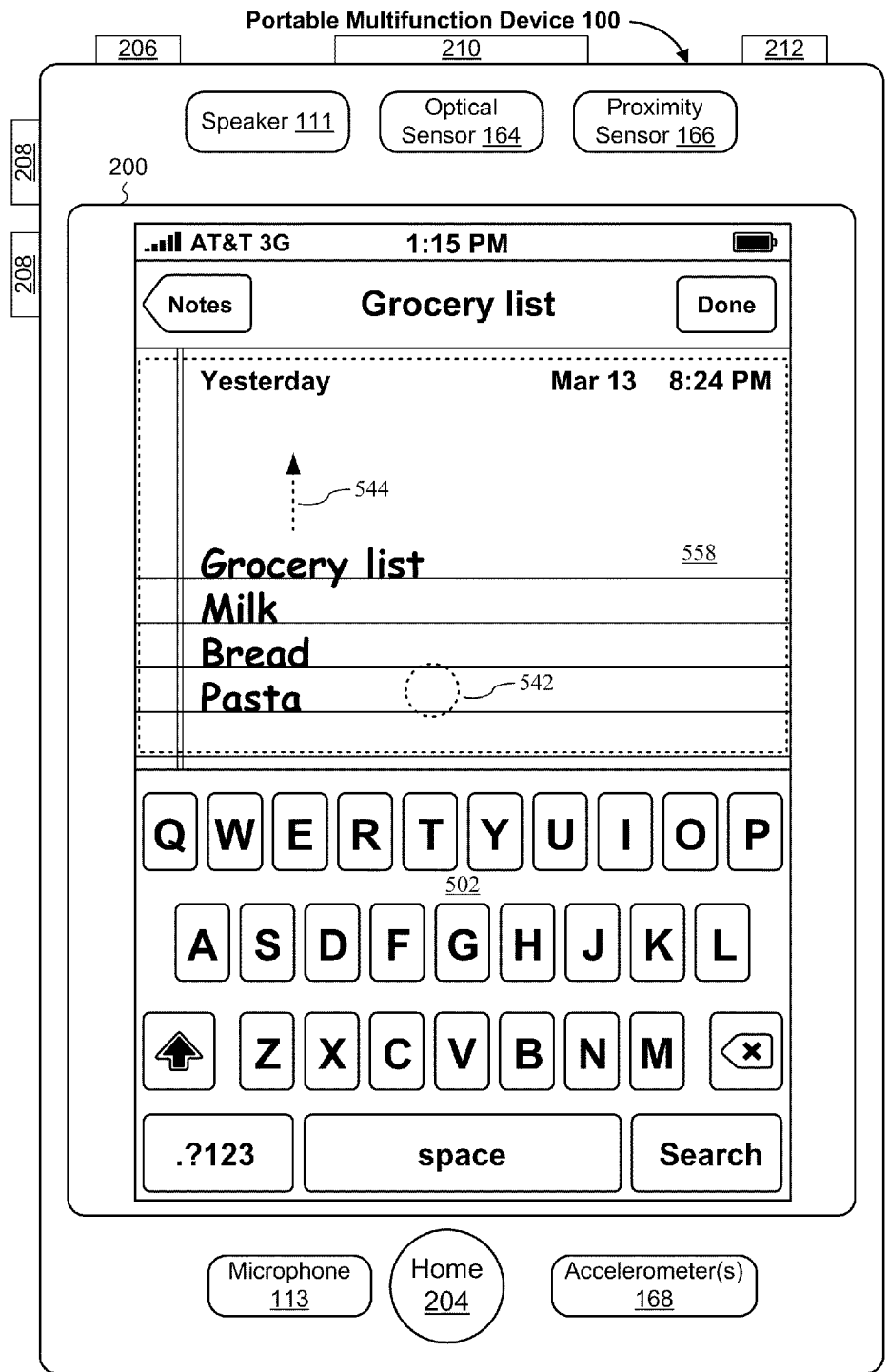
Figure 5N:
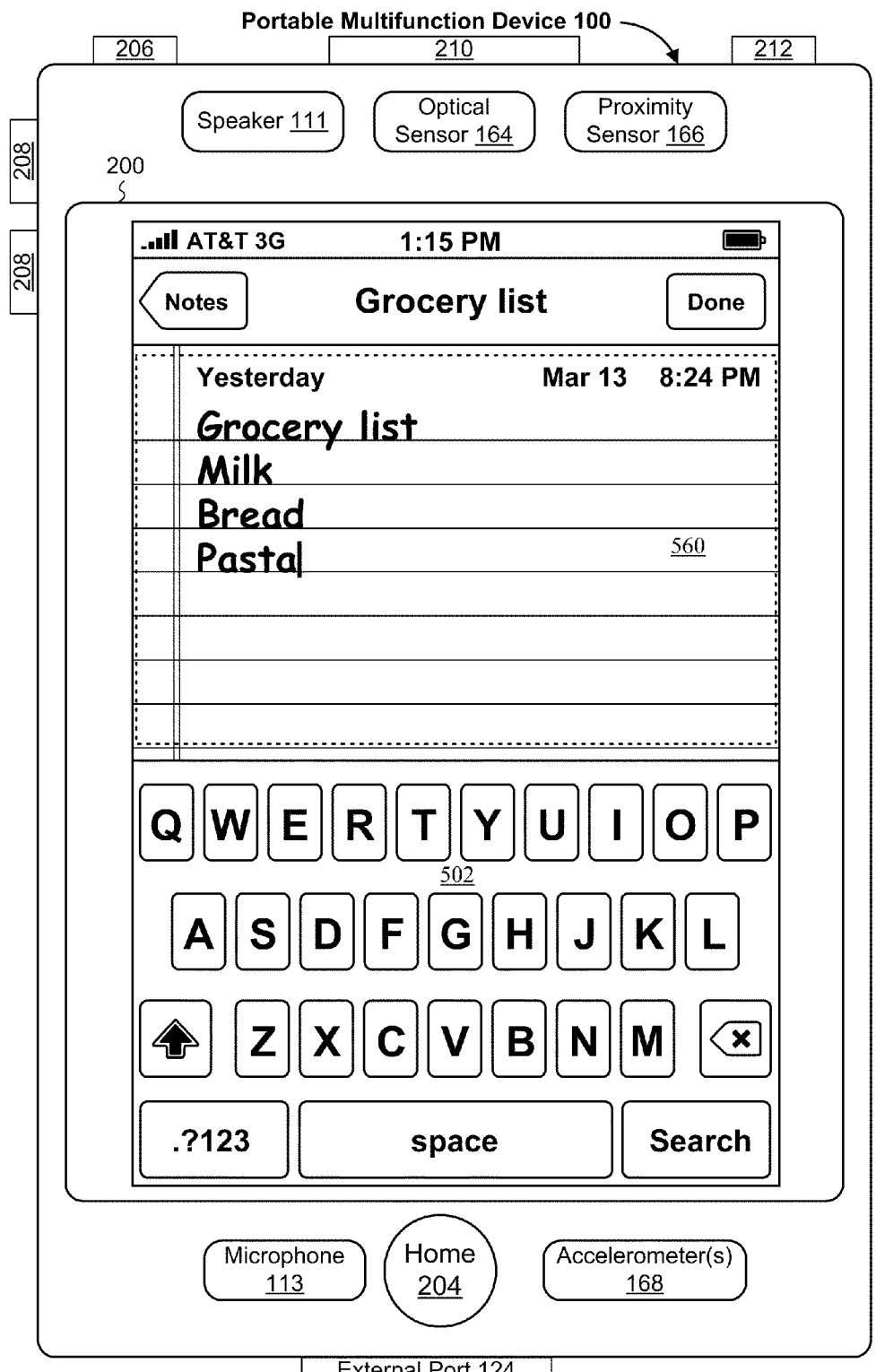

FIGS. 5L-5N illustrate an exemplary series of views of a multifunction device employing smart keyboard management in accordance with some embodiments. This series is similar to FIGS. 5H-5K, but displays a grocery list rather than contacts. FIGS. 5L-5N will be described in more detail below with respect to FIGS. 6A-6B and 7A-7C.

Figure 6A:
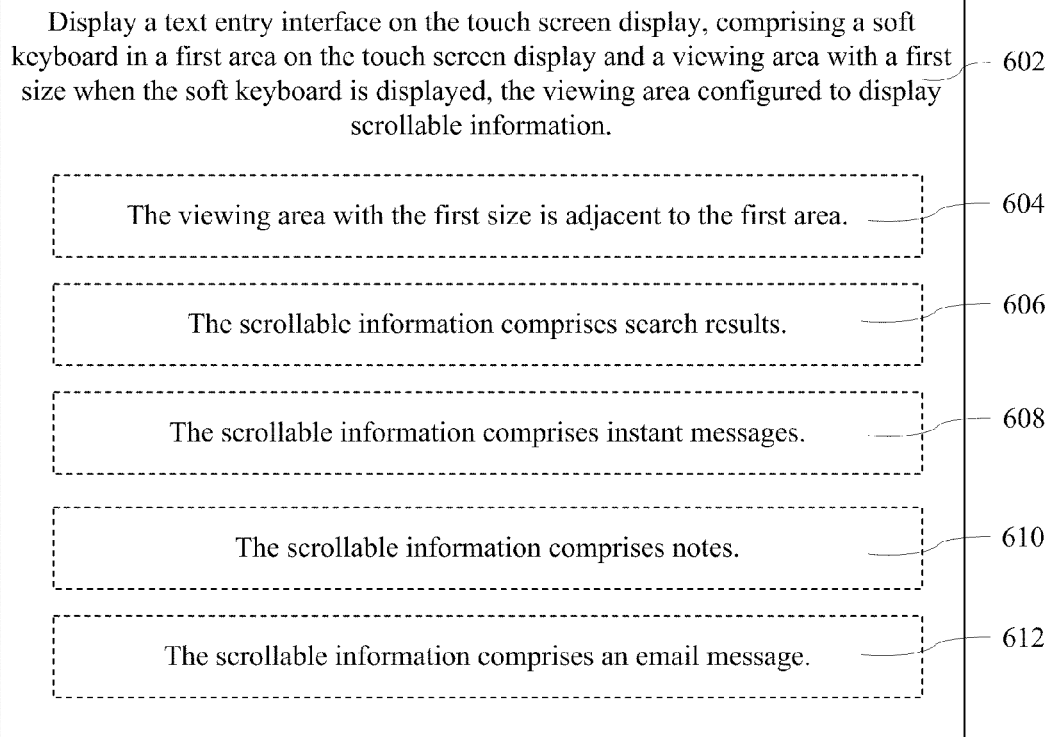
FIGS. 6A-6B are flow diagrams illustrating a method of scrolling with smart keyboard management in accordance with some embodiments.
Figure 6A:
Figure 6B:
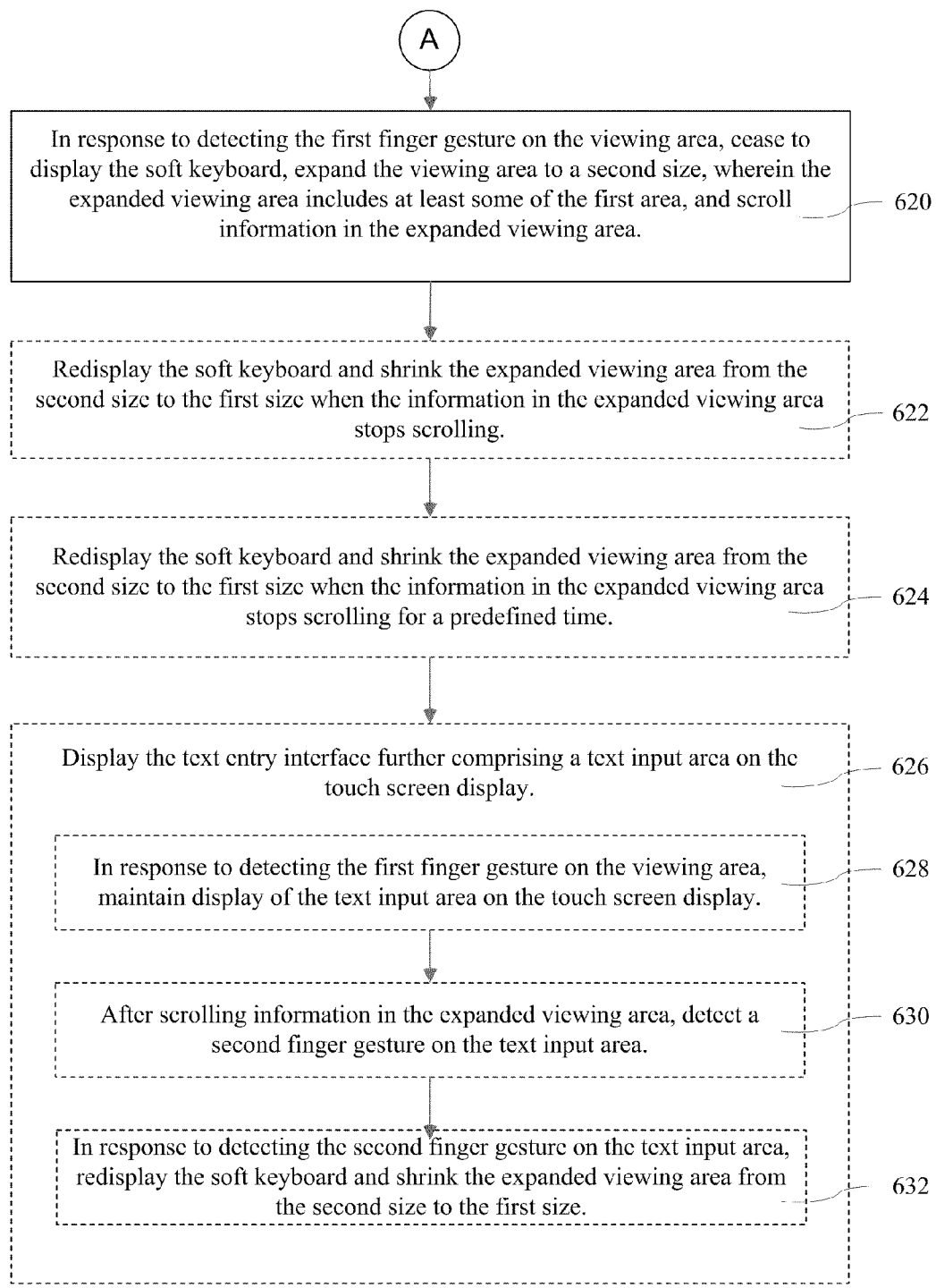

FIGS. 6A-6B are flow diagrams illustrating a method of scrolling employing smart keyboard management in accordance with some embodiments. The method 600 is performed at a multifunction device (e.g., device 100 in FIG. 2) with a touch screen display. Some operations in method 600 may be combined and/or the order of some operations may be changed.

As described below, the method 600 efficiently combines a soft keyboard for data entry on a touch screen device and a larger viewing area for faster scrolling of information on the touch screen display. Method 600 uses various criteria to determine when to display the soft keyboard and when to hide the soft keyboard for faster scrolling, thus enabling a user enter data and scroll to desired information more quickly. The method reduces the cognitive burden on a user during data entry and scrolling, thereby creating a more efficient human-machine interface. For battery-operated computing devices, enabling a user to scroll information more quickly and efficiently conserves power and increases the time between battery charges.

The device displays a text entry interface on the touch screen display (602). The text entry interface includes a soft keyboard in a first area of the touch screen display, and a viewing area configured to display scrollable information (602). The viewing area has a first size when the soft keyboard is being simultaneously displayed (602). FIG. 5A shows an exemplary soft keyboard 502, which includes the letters of the alphabet, a space bar, and some function keys. The viewing area may display text input by a user with the soft keyboard as shown in FIGS. 5H-5N. For example, FIG. 5L shows a grocery list that has been entered by a user. The viewing area may display search results as shown in FIGS. 5A-5G. For example, the contact lists in FIGS. 5A and 5E are search results from a user query. FIG. 5A has viewing area 508 displaying contacts 508-1, 508-2, and others. FIG. 5E has viewing area 532 displaying two contacts.

In some embodiments, the viewing area is adjacent to the first area (604). For example, viewing area 508 in FIG. 5A is adjacent to soft keyboard 502, which is displayed in a first area. In some embodiments, the scrollable information comprises search results (606). For example, in FIG. 5A a user has entered the letter "A" 506 in text input area 504, and the multifunction device is displaying responsive search results. E.g., search results 508-1 and 508-2 in FIG. 5A. In some embodiments, the scrollable information comprises instant messages (608). In some embodiments, the scrollable information comprises notes (610). For example, FIG. 5H illustrates a viewing area 548 with a grocery list. A grocery list is one example of a note. In some embodiments, the scrollable information comprises an email message (612) or other electronic document.

The device detects (614) a first finger gesture on the viewing area. For example, FIG. 5A shows viewing area 508. FIG. 5B displays a first finger gesture 512, beginning with the finger at location 510. In some embodiments, the finger gesture is a swipe gesture (616). In some embodiments, the finger gesture is a vertical swipe gesture (618).

The device responds (620) to the first finger gesture by performing several operations. First, the device ceases to display the soft keyboard. For example, FIG. 5A illustrates an embodiment with the soft keyboard 502 displayed. FIG. 5B illustrates a finger gesture 512 beginning at location 510. In response to the finger gesture, the soft keyboard 502 has been hidden in FIG. 5B. In some embodiments, the device ceases to display the soft keyboard 502 as soon as a finger gesture has been detected. In some embodiments, the device ceases to display the soft keyboard a predetermined amount of time after a finger gesture has been detected (e.g., 10 milliseconds, 50 milliseconds, 40 milliseconds to 250 milliseconds, sec.).

The device further responds (620) to the first finger gesture by expanding the viewing area to a second size. The expanded viewing area includes at least part of the first area (i.e., the area originally occupied by the soft keyboard). For example, FIG. 5B shows expanded viewing area 546, expanding from viewing area 508 in FIG. 5A. The expanded viewing area 546 in FIG. 5B includes all of the first area that was originally occupied by the soft keyboard 502. Similarly, FIG. 5I illustrates expanded viewing area 520, which includes the viewing area 548 from FIG. 5H and the first area that was previously occupied by the soft keyboard 502. In some embodiments, the expanded viewing area does not include all of the first area.

The device further responds (620) to the first finger gesture by scrolling the information in the expanded viewing area. For example, FIG. 5C shows the search results after scrolling the information displayed in FIG. 5B. As a result of the scrolling, the search results shown in FIG. 5C are further in the alphabetical list. Similarly, FIG. 5J illustrates an example of scrolling the grocery list partially shown in FIG. 5I.

In some embodiments, the device redisplays the soft keyboard and shrinks the expanded viewing area from the second size back to the first size when the information in the expanded viewing area stops scrolling (622). In some embodiments, the device redisplays the soft keyboard and shrinks the expanded viewing area from the second size back to the first size when the information in the expanded viewing area stops scrolling for a predefined time (624). For example, the predefined time may be 0.2 seconds, 0.5 seconds, or 1.0 seconds. FIGS. 5D and 5K illustrate redisplay of the soft keyboard 502 after the information stops scrolling (or stops scrolling for a predefined time). Further, the transition from FIG. 5J to FIG. 5K illustrates how the device shrinks the expanded viewing area 550 back to the viewing area 530 when the information stops scrolling (or stops scrolling for a predefined time).

In some embodiments, the text entry interface further comprises (626) a text input area on the touch screen display. FIG. 5A shows exemplary text input area 504, which shows the input "A" 506 entered by a user. In some embodiments, the device responds to detecting the first finger gesture by maintaining (628) display of the text input area on the touch screen display. FIGS. 5E-5G illustrate maintaining display of text input area 552. The text input area 552 is displayed in each of FIGS. 5E-5G, even though there has been a first finger gesture that scrolls the information in the viewing area. Similarly, FIGS. 5A-5D illustrate maintaining display of the text input area 504 on the touch screen display. The text input area 504 is displayed in each of FIGS. 5A-5D, even though there has been a first finger gesture, scrolling of information in the viewable area, and the soft keyboard was not displayed while the information was scrolling in the viewing area.

In some embodiments, with a text input area, the device detects (630) a second finger gesture after scrolling information in the expanded viewing area. For example, the second finger gesture could be a finger tap gesture. For example, a finger tap gesture could be made in the text input area 504 in FIG. 5C. In some embodiments, with a text input area, the device responds (632) to the second finger gesture by redisplaying the soft keyboard and shrinking the expanded viewing area from the second size to the first size. For example, FIGS. 5C and 5D illustrate method 600 responding to a second finger gesture 562 in text input area 504 in FIG. 5C. In response to the second finger gesture, method 600 redisplays soft keyboard 502 in FIG. 5D, and the expanded viewing area 554 with the second size shrinks back to the viewing area 556 with the first size.

Figure 7A:
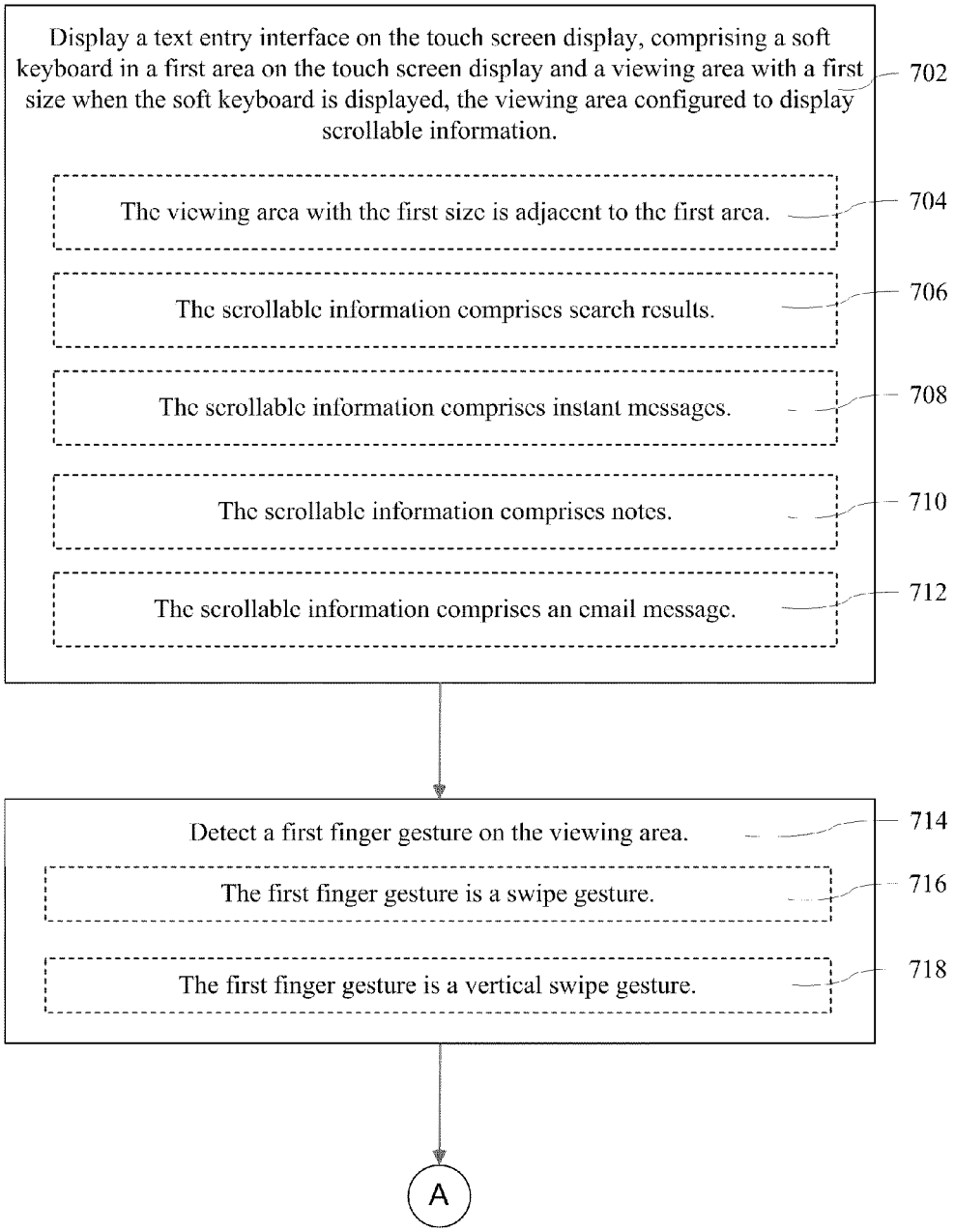
FIGS. 7A-7C are flow diagrams illustrating a method of scrolling with smart keyboard management in accordance with some embodiments.
Figure 7B:
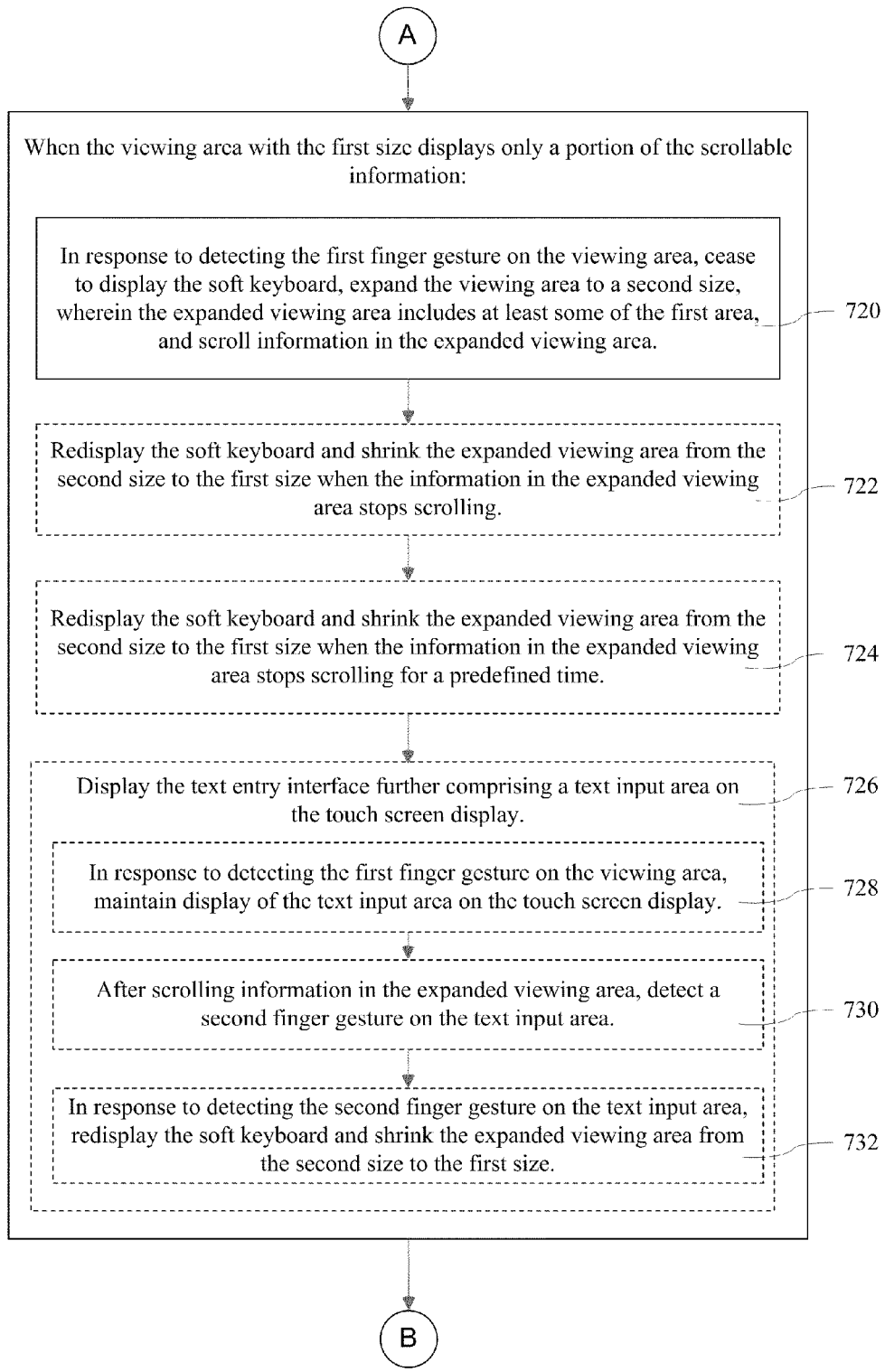
Figure 7C:
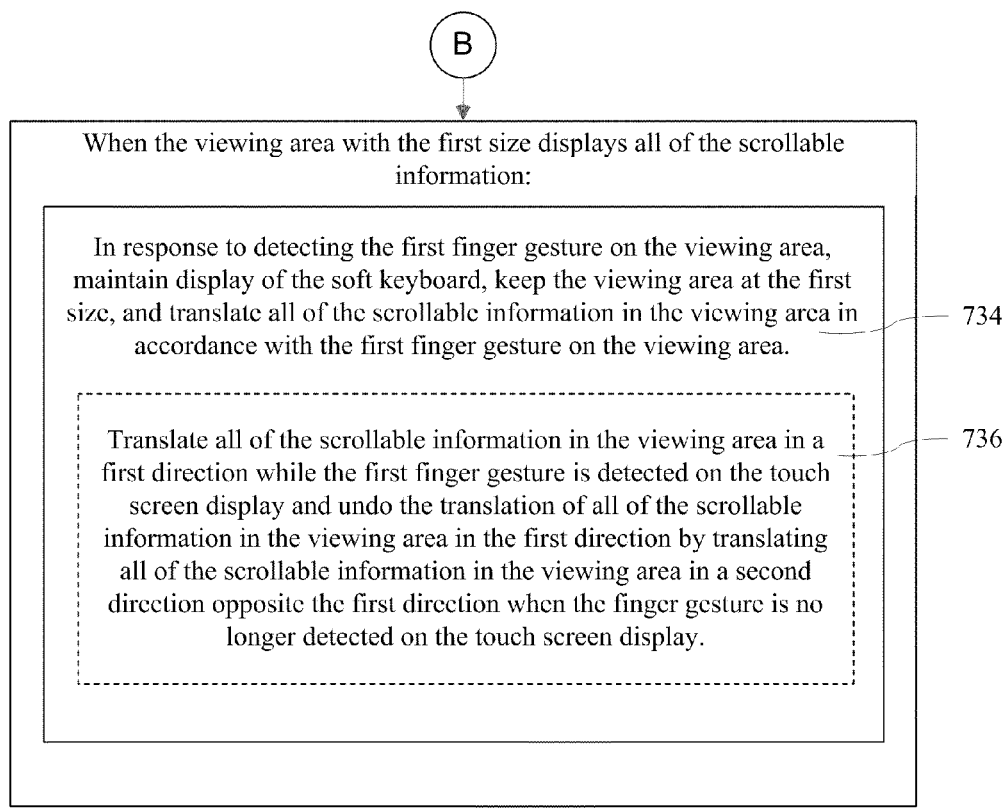

FIGS. 7A-7B are flow diagrams illustrating a method of scrolling employing smart keyboard management in accordance with some embodiments. The method 700 is performed at a multifunction device (e.g., device 100 in FIG. 2) with a touch screen display. Some operations in method 700 may be combined and/or the order of some operations may be changed.

As described below, the method 700 efficiently combines a soft keyboard for data entry on a touch screen device and a larger viewing area for faster scrolling of information on the touch screen display. Method 700 uses various criteria to determine when to display the soft keyboard and when to hide the soft keyboard for faster scrolling, thus enabling a user enter data and scroll to desired information more quickly. The method reduces the cognitive burden on a user during data entry and scrolling, thereby creating a more efficient human-machine interface. For battery-operated computing devices, enabling a user to scroll information more quickly and efficiently conserves power and increases the time between battery charges.

The device displays a text entry interface on the touch screen display (702). The text entry interface includes a soft keyboard in a first area of the touch screen display, and a viewing area configured to display scrollable information (702). The viewing area has a first size when the soft keyboard is being simultaneously displayed (702). FIG. 5A shows an exemplary soft keyboard 502, which includes the letters of the alphabet, a space bar, and some function keys. The viewing area may display text input by a user with the soft keyboard as shown in FIGS. 5H-5N. For example, FIG. 5L shows a grocery list that has been entered by a user. The viewing area may display search results as shown in FIGS. 5A-5G. For example, the contact lists in FIGS. 5A and 5E are search results from a user query. FIG. 5A has viewing area 508 displaying contacts 508-1, 508-2, and others. FIG. 5E has viewing area 532 displaying two contacts.

In some embodiments, the viewing area is adjacent to the first area (704). For example, viewing area 508 in FIG. 5A is adjacent to the soft keyboard 502, which is displayed in a first area. In some embodiments, the scrollable information comprises search results (706). For example, in FIG. 5A a user has entered the letter "A" 506 in text input area 504, and the multifunction device is displaying responsive search results. In some embodiments, the scrollable information comprises instant messages (708). In some embodiments, the scrollable information comprises notes (710). For example, FIG. 5H illustrates a viewing area 548 with a grocery list. A grocery list is one example of a note. In some embodiments, the scrollable information comprises an email message (712) or other electronic document.

The device detects (714) a first finger gesture on the viewing area. For example, FIG. 5A shows viewing area 508. FIG. 5B displays a first finger gesture 512, beginning with the finger at location 510. In some embodiments, the finger gesture is a swipe gesture (716). In some embodiments, the finger gesture is a vertical swipe gesture (718).

The device responds to the first finger gesture in different ways depending on whether all of the scrollable information is displayed in the viewing area with the first size.

When the viewing area with the first size displays only a portion of the scrollable information, the device responds (720) to the first finger gesture by performing several operations. First, the device ceases to display the soft keyboard. For example, FIG. 5A illustrates an embodiment with the soft keyboard 502 displayed. FIG. 5B illustrates a finger gesture 512 beginning at location 510. In response to the finger gesture, the soft keyboard 502 has been hidden in FIG. 5B. Similarly, FIG. 5H illustrates an embodiment with the soft keyboard 502 displayed. FIG. 5I illustrates a finger gesture 524 beginning at location 522. In response to the finger gesture, the soft keyboard 502 has been hidden in FIG. 5I.

In some embodiments, the device ceases to display the soft keyboard 502 as soon as a finger gesture has been detected. In some embodiments, the device ceases to display the soft keyboard a predetermined amount of time after a finger gesture has been detected (e.g., 10 milliseconds, 50 milliseconds, or 40-250 milliseconds, etc.).

The device further responds (720) to the first finger gesture by expanding the viewing area to a second size. The expanded viewing area includes at least part of the first area (i.e., the area originally occupied by the soft keyboard). For example, FIG. 5B shows expanded viewing area 546, expanding from viewing area 508 in FIG. 5A. The expanded viewing area 546 in FIG. 5B includes all of the first area that was originally occupied by the soft keyboard 502. Similarly, FIG. 5I illustrates expanded viewing area 520, which includes the viewing area 548 from FIG. 5H and the first area that was previously occupied by the soft keyboard 502. In some embodiments, the expanded viewing area does not include all of the first area.

The device further responds (720) to the first finger gesture by scrolling the information in the expanded viewing area. For example, FIG. 5C shows the search results after scrolling the information displayed in FIG. 5B. As a result of the scrolling, the search results shown in FIG. 5C are further in the alphabetical list. Similarly, FIG. 5J illustrates an example of scrolling the grocery list partially shown in FIG. 5I.

In some embodiments, the device redisplays the soft keyboard and shrinks the expanded viewing area from the second size back to the first size when the information in the expanded viewing area stops scrolling (722). In some embodiments, the device redisplays the soft keyboard and shrinks the expanded viewing area from the second size back to the first size when the information in the expanded viewing area stops scrolling for a predefined time (724). For example, the predefined time may be 0.2 seconds, 0.5 seconds, or 1.0 seconds. FIGS. 5D and 5K illustrate redisplay of the soft keyboard 502 after the information stops scrolling (or stops scrolling for a predefined time). Further, the transition from FIG. 5J to FIG. 5K illustrates how the device shrinks the expanded viewing area 550 back to the viewing area 530 when the information stops scrolling (or stops scrolling for a predefined time).

In some embodiments, the text entry interface further comprises (726) a text input area on the touch screen display. FIG. 5A shows exemplary text input area 504, which shows the input "A" 506 entered by a user. In some embodiments, the device responds to detecting the first finger gesture by maintaining (728) display of the text input area on the touch screen display. FIGS. 5E-5G illustrate maintaining display of text input area 552. The text input area 552 is displayed in each of FIGS. 5E-5G, even though there has been a first finger gesture that scrolls the information in the viewing area. Similarly, FIGS. 5A-5D illustrate maintaining display of the text input area 504 on the touch screen display. The text input area 504 is displayed in each of FIGS. 5A-5D, even though there has been a first finger gesture, scrolling of information in the viewable area, and the soft keyboard was not displayed while the information was scrolling in the viewing area.

In some embodiments, with a text input area, the device detects (730) a second finger gesture after scrolling information in the expanded viewing area. For example, the second finger gesture could be a finger tap gesture. For example, a finger tap gesture could be made in the text input area 504 in FIG. 5C. In some embodiments, with a text input area, the device responds (732) to the second finger gesture by redisplaying the soft keyboard and shrinking the expanded viewing area from the second size to the first size. For example, FIGS. 5C and 5D illustrate the device responding to a second finger gesture 562 in text input area 504 in FIG. 5C. In response to the second finger gesture, the device redisplays soft keyboard 502 in FIG. 5D, and the expanded viewing area 554 with the second size shrinks back to the viewing area 556 with the first size.

When the viewing area with the first size displays all of the scrollable information, the device responds (734) to the first finger gesture (e.g., contact 514 plus movement 516 in FIG. 5E or contact 538 plus movement 540 in FIG. 5L) by performing several operations. First, the device maintains (734) display of the soft keyboard. For example, in FIG. 5L the scrollable information (the grocery list) is all displayed in the viewable area 518 with the first size. Because all of the scrollable information is displayed in the viewable area with the first size, the soft keyboard 502 remains displayed in FIG. 5M as a user scrolls the grocery list. The soft keyboard further remains displayed after the scrolling is complete, as shown in FIG. 5N.

Additionally, the device responds to the first finger gesture by keeping (734) the viewing area at the first size. For example, the viewing area 558 in FIG. 5M is the first size (i.e., the size of viewing area 518 in FIG. 5L).

Additionally, the device responds to the first finger gesture by translating (734) all of the scrollable information in the viewing area in accordance with the first finger gesture on the viewing area. The transition from FIG. 5L to FIG. 5M shows an exemplary translation of the scrollable information. In FIG. 5L, the grocery list is near the top of the viewing area 518. Finger gesture 540 in FIG. 5L caused the grocery list to translate downward in the viewing area in accordance with the finger gesture, as shown in viewing area 558 in FIG. 5M. As shown in FIG. 5M, the user's finger lifts off the viewing area at location 542, thus completing the finger gesture.

In some embodiments, the device translates (736) all of the scrollable information in the viewing area in a first direction while the first finger gesture is detected on the touch screen display. As explained above, the transition from FIG. 5L to FIG. 5M shows the grocery list translated downward (a first direction) in accordance with the finger gesture 540 on the viewing area 518. The device undoes the translation of all of the scrollable information in the viewing area in the first direction by translating all of the scrollable information in the viewing area in a direction opposite the first direction when the finger gesture is no longer detected on the touch screen display. FIGS. 5L-5N illustrate an exemplary series of operations: the device translates the scrollable information in viewing area 518 of FIG. 5L downward in accordance with finger gesture 540 in FIG. 5L; then, after the finger lifts off at 542 in FIG. 5M, the finger gesture is no longer detected, so the scrollable information in viewing area 558 is translated upward (opposite the first direction) as shown in the viewing area 560 in FIG. 5N.

Similarly, FIGS. 5E-5G illustrate an exemplary series of operations: the device translates the scrollable information in viewing area 532 of FIG. 5E downward in accordance with finger gesture 516 in FIG. 5E; then, after the finger lifts off at 534 in FIG. 5F, the finger gesture is no longer detected, so the scrollable information in viewing area 532 is translated upward 536 (opposite the first direction) as shown in the viewing area 532 in FIG. 5G.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a multifunction device with a touch screen display:
        displaying a text entry interface on the touch screen display, the text entry interface comprising:
            a soft keyboard in a first area on the touch screen display, and
            a viewing area with a first size when the soft keyboard is displayed, the viewing area configured to display scrollable information;
        detecting a first finger scrolling gesture on the viewing area;
        when the viewing area with the first size displays only a portion of the scrollable information, in response to detecting the first finger scrolling gesture on the viewing area:
            ceasing to display the soft keyboard, expanding the viewing area to a second size, wherein the expanded viewing area includes at least some of the first area, and scrolling the scrollable information in the expanded viewing area; and, when the viewing area with the first size displays all of the scrollable information, in response to detecting the first finger scrolling gesture on the viewing area:

maintaining display of the soft keyboard, keeping the viewing area at the first size, and translating all of the scrollable information in the viewing area in accordance with the first finger scrolling gesture on the viewing area.

2. The method of claim 1, wherein translating all of the scrollable information in the viewing area in accordance with the first finger scrolling gesture on the viewing area comprises:

translating all of the scrollable information in the viewing area in a first direction while the first finger scrolling gesture is detected on the touch screen display; and undoing the translation of all of the scrollable information in the viewing area in the first direction by translating all of the scrollable information in the viewing area in a second direction opposite the first direction when the first finger scrolling gesture is no longer detected on the touch screen display.

3. The method of claim 1, wherein the viewing area with the first size is adjacent to the first area.

4. The method of claim 1, wherein the first finger scrolling gesture is a swipe gesture.

5. The method of claim 1, wherein the first finger scrolling gesture is a vertical swipe gesture.

6. The method of claim 1, including:

after scrolling the scrollable information in the expanded viewing area, redisplaying the soft keyboard and shrinking the expanded viewing area from the second size to the first size when the scrollable information in the expanded viewing area stops scrolling.

7. The method of claim 1, including:

after scrolling the scrollable information in the expanded viewing area, redisplaying the soft keyboard and shrinking the expanded viewing area from the second size to the first size after the scrollable information in the expanded viewing area stops scrolling for a predefined time.

8. The method of claim 1, wherein the text entry interface includes a text input area on the touch screen display, the method further including:

in response to detecting the first finger scrolling gesture on the viewing area, maintaining display of the text input area on the touch screen display;

after scrolling the scrollable information in the expanded viewing area, detecting a second finger gesture on the text input area; and, in response to detecting the second finger gesture on the text input area:

redisplaying the soft keyboard, and shrinking the expanded viewing area from the second size to the first size.

9. A graphical user interface on a multifunction device with a touch screen display, comprising:

displaying a text entry interface on the touch screen display, the text entry interface comprising:

a soft keyboard in a first area on the touch screen display, and a viewing area with a first size when the soft keyboard is displayed, the viewing area configured to display scrollable information;

detecting a finger scrolling gesture on the viewing area;

wherein:

when the viewing area with the first size displays only a portion of the scrollable information, in response to detecting the finger scrolling gesture on the viewing area:

ceasing to display the soft keyboard, expanding the viewing area to a second size, wherein the expanded viewing area includes at least some of the first area, and scrolling the scrollable information in the expanded viewing area; and, when the viewing area with the first size displays all of the scrollable information, in response to detecting the finger scrolling gesture on the viewing area:

maintaining display of the soft keyboard, keeping the viewing area at the first size, and translating the scrollable information in the viewing area in accordance with the finger scrolling gesture on the viewing area.

10. A multifunction device, comprising:

a touch screen display;

one or more processors;

memory; and one or more programs, wherein the one or more programs are stored in the memory and configured to be executed by the one or more processors, the one or more programs including instructions for:

displaying a text entry interface on the touch screen display, the text entry interface comprising:

a soft keyboard in a first area on the touch screen display, and a viewing area with a first size when the soft keyboard is displayed, the viewing area configured to display scrollable information;

detecting a finger scrolling gesture on the viewing area;

when the viewing area with the first size displays only a portion of the scrollable information, in response to detecting the finger scrolling gesture on the viewing area:

ceasing to display the soft keyboard, expanding the viewing area to a second size, wherein the expanded viewing area includes at least some of the first area, and scrolling the scrollable information in the expanded viewing area; and, when the viewing area with the first size displays all of the scrollable information, in response to detecting the finger scrolling gesture on the viewing area:

maintaining display of the soft keyboard, keeping the viewing area at the first size, and translating the scrollable information in the viewing area in accordance with the finger scrolling gesture on the viewing area.

11. A non-transitory computer readable storage medium storing one or more programs, the one or more programs comprising instructions, which when executed by a multifunction device with a touch screen display, cause the device to:

display a text entry interface on the touch screen display, the text entry interface comprising:

a soft keyboard in a first area on the touch screen display, and a viewing area with a first size when the soft keyboard is displayed, the viewing area configured to display scrollable information;

detect a finger scrolling gesture on the viewing area;

when the viewing area with the first size displays only a portion of the scrollable information, in response to detecting the finger scrolling gesture on the viewing area:
- cease to display the soft keyboard,
- expand the viewing area to a second size, wherein the expanded viewing area includes at least some of the first area, and
- scroll the scrollable information in the expanded viewing area; and, when the viewing area with the first size displays all of the scrollable information, in response to detecting the finger scrolling gesture on the viewing area:
- maintain display of the soft keyboard,
- keep the viewing area at the first size, and
- translate the scrollable information in the viewing area in accordance with the finger scrolling gesture on the viewing area.

12. The device of claim 10, wherein translating all of the scrollable information in the viewing area in accordance with the first finger scrolling gesture on the viewing area comprises:
- translating all of the scrollable information in the viewing area in a first direction while the first finger scrolling gesture is detected on the touch screen display; and
- undoing the translation of all of the scrollable information in the viewing area in the first direction by translating all of the scrollable information in the viewing area in a second direction opposite the first direction when the first finger scrolling gesture is no longer detected on the touch screen display.

13. The device of claim 10, wherein the viewing area with the first size is adjacent to the first area.

14. The device of claim 10, wherein the finger scrolling gesture is a swipe gesture.

15. The device of claim 10, wherein the finger scrolling gesture is a vertical swipe gesture.

16. The device of claim 10, including instructions for:
- after scrolling the scrollable information in the expanded viewing area, redisplaying the soft keyboard and shrinking the expanded viewing area from the second size to the first size when the scrollable information in the expanded viewing area stops scrolling.

17. The device of claim 10, including instructions for:
- after scrolling the scrollable information in the expanded viewing area, redisplaying the soft keyboard and shrinking the expanded viewing area from the second size to the first size after the scrollable information in the expanded viewing area stops scrolling for a predefined time.

18. The device of claim 10, wherein the text entry interface includes a text input area on the touch screen display, the device including instructions for:
- in response to detecting the finger scrolling gesture on the viewing area, maintaining display of the text input area on the touch screen display;
- after scrolling the scrollable information in the expanded viewing area, detecting a second finger gesture on the text input area; and,
- in response to detecting the second finger gesture on the text input area:
  - redisplaying the soft keyboard, and
  - shrinking the expanded viewing area from the second size to the first size.

19. The computer readable storage medium of claim 11, wherein translating all of the scrollable information in the viewing area in accordance with the first finger scrolling gesture on the viewing area comprises:
- translating all of the scrollable information in the viewing area in a first direction while the first finger scrolling gesture is detected on the touch screen display; and
- undoing the translation of all of the scrollable information in the viewing area in the first direction by translating all of the scrollable information in the viewing area in a second direction opposite the first direction when the first finger scrolling gesture is no longer detected on the touch screen display.

20. The computer readable storage medium of claim 11, wherein the viewing area with the first size is adjacent to the first area.

21. The computer readable storage medium of claim 11, wherein the finger scrolling gesture is a swipe gesture.

22. The computer readable storage medium of claim 11, wherein the finger scrolling gesture is a vertical swipe gesture.

23. The computer readable storage medium of claim 11, including instructions which cause the device to:
- after scrolling the scrollable information in the expanded viewing area, redisplay the soft keyboard and shrink the expanded viewing area from the second size to the first size when the scrollable information in the expanded viewing area stops scrolling.

24. The computer readable storage medium of claim 11, including instructions which cause the device to:
- after scrolling the scrollable information in the expanded viewing area, redisplay the soft keyboard and shrink the expanded viewing area from the second size to the first size after the scrollable information in the expanded viewing area stops scrolling for a predefined time.

25. The computer readable storage medium of claim 11, wherein the text entry interface includes a text input area on the touch screen display, the computer readable storage medium including instructions which cause the device to:
- in response to detecting the finger scrolling gesture on the viewing area, maintain display of the text input area on the touch screen display;
- after scrolling the scrollable information in the expanded viewing area, detect a second finger gesture on the text input area; and,
- in response to detecting the second finger gesture on the text input area:
  - redisplay the soft keyboard, and
  - shrink the expanded viewing area from the second size to the first size.

* * * * *